United States Patent [19]

Furuta et al.

[11] Patent Number: 5,324,991
[45] Date of Patent: Jun. 28, 1994

[54] NEURON UNIT AND NEURON UNIT NETWORK

[75] Inventors: Toshiyuki Furuta; Hiroyuki Horiguchi; Hirotoshi Eguchi, all of Yokohama; Atsuo Hashimoto, Nishinomiya; Sugitaka Oteki, Minoo; Toshihiro Tsukagoshi, Itami; Satoshi Otsuki, Nishinomiya; Eiki Aono, Minoo; Shuji Motomura, Yokohama; Takahiro Watanabe, Sagamihara, all of Japan

[73] Assignee: Ricoh Company, Ltd., Tokyo, Japan

[21] Appl. No.: 989,605

[22] Filed: Dec. 11, 1992

Related U.S. Application Data

[60] Continuation-in-part of Ser. No. 971,476, Nov. 4, 1992, which is a division of Ser. No. 856,645, Mar. 24, 1992, Pat. No. 5,185,851, which is a division of Ser. No. 550,404, Jul. 10, 1990, Pat. No. 5,131,073.

[30] Foreign Application Priority Data

| Jul. 12, 1989 | [JP] | Japan | 1-179629 |
|---|---|---|---|
| Mar. 12, 1990 | [JP] | Japan | 2-60739 |
| Mar. 16, 1990 | [JP] | Japan | 2-67937 |
| Dec. 11, 1991 | [JP] | Japan | 3-351410 |
| Jan. 24, 1992 | [JP] | Japan | 4-11217 |
| Feb. 6, 1992 | [JP] | Japan | 4-21284 |
| Mar. 12, 1992 | [JP] | Japan | 4-53204 |
| Mar. 24, 1992 | [JP] | Japan | 4-65637 |
| Jul. 31, 1992 | [JP] | Japan | 4-224702 |

[51] Int. Cl.⁵ ............................................. G06F 15/18
[52] U.S. Cl. ............................................. 307/201; 395/25
[58] Field of Search ............................ 307/201; 395/25–27

[56] References Cited

U.S. PATENT DOCUMENTS

| 4,518,866 | 5/1985 | Clymer | 307/201 |
|---|---|---|---|
| 4,893,255 | 1/1990 | Tomlinson, Jr. | 364/513 |
| 4,951,243 | 8/1990 | Tomlinson, Jr. | 364/717 |
| 4,994,982 | 2/1991 | Duranton et al. | 307/207 |
| 4,996,648 | 2/1991 | Jourjine | 307/201 X |
| 5,131,073 | 7/1992 | Furata et al. | 395/27 |
| 5,175,798 | 12/1992 | Taylor et al. | 395/27 |
| 5,259,064 | 11/1993 | Furuta et al. | 395/27 X |

FOREIGN PATENT DOCUMENTS 1-244567  9/1989  Japan .

OTHER PUBLICATIONS

Ito, T., et al., "A Neural Network Model Extracting Features From Speech Signals", *Electronic Information Communication Society Papers*, Feb. 1987, vol. J70-D, No. 2.

(List continued on next page.)

*Primary Examiner*—David R. Hudspeth
*Attorney, Agent, or Firm*—Mason, Fenwick & Lawrence

[57] ABSTRACT

A neuron unit processes a plurality of binary input signals and outputs a neuron output signal which is indicative of a result of the processing. The neuron unit is provided with a plurality of first gates respectively for carrying out a logical operation on a binary input signal and a weighting coefficient, a second gate for carrying out a logical operation on an excitatory output signal of each of the first gates, a third gate for carrying out a logic operation on an inhibitory output signal of each of the first gates, a fourth gate for synthesizing output signals of the second and third gates and outputting the neuron output signal, and a generating circuit for generating the weighting coefficients which are supplied to each of the first gates. The generating circuit for generating one weighting coefficient includes a random number generator for generating random numbers, and a comparator for comparing each random number r with a predetermined value q and for outputting a pulse signal having first and second values depending on whether each random number r is such that $r \leq q$ or $r > q$, and each weighting coefficient is described by a pulse density.

15 Claims, 28 Drawing Sheets

OTHER PUBLICATIONS

Murray et al., "Asynchronous Arithmetic for VLSI Neural Systems", *Electronic Letters*, Jun. 4, 1987, vol. 23, No. 12.

Murray et al., "A Novel Computation and Signalling Method for VLSI Neural Networks", *Digest of Technical Papers, ESSCIRC '87*, Thirteenth European Solid-State Circuits Conference, Sep. 23-25, 1987.

K. Fukushima, "Improvement in Pattern-Selectivity of a Cognitron", Electronic Communication Society Papers Oct. 1979, vol. J62-A, No. 10.

W. Banzhaf, "On a Simple Stochastic Neuron-like Unit", *Biological Cybernetics*, vol. 60, No. 2, 1988, pp. 153-160.

Kamada et al., "Digital Neuron Model", Electronic Information Communication Society Spring National Conference, 1988.

Yoshida et al., "Neural Coupling Model of Visual Domain", Electronic Communication Society National Conference, 1974.

K. Fukushima, "Cognitron", Electronic Communication Society National Conference, 1974.

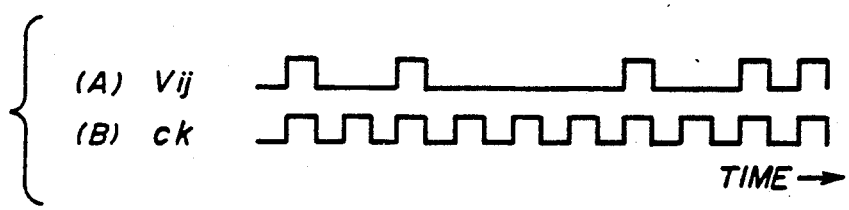
FIG.5  (A) Vij  (B) ck
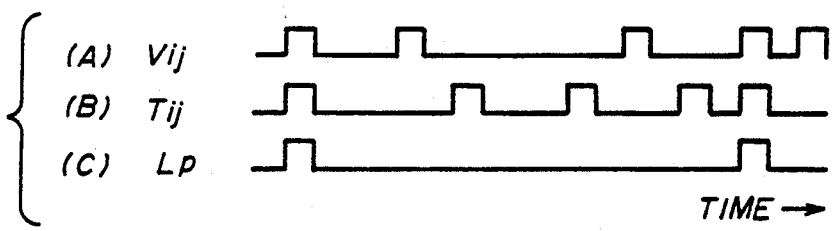
FIG.6  (A) Vij  (B) Tij  (C) Lp
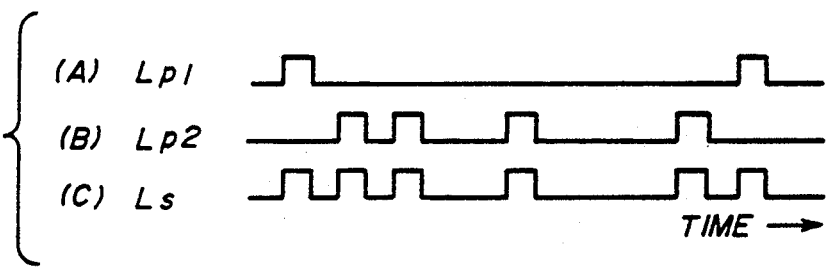
FIG.7  (A) Lp1  (B) Lp2  (C) Ls
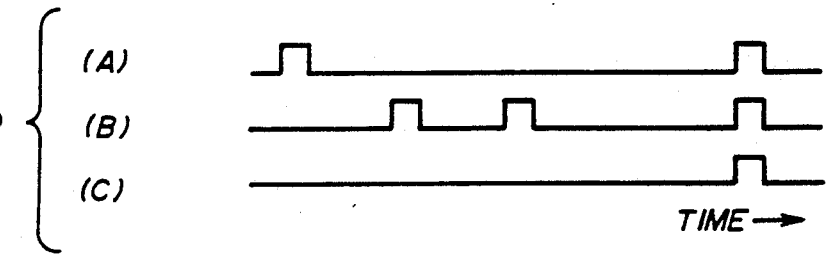
FIG.8  (A)  (B)  (C)

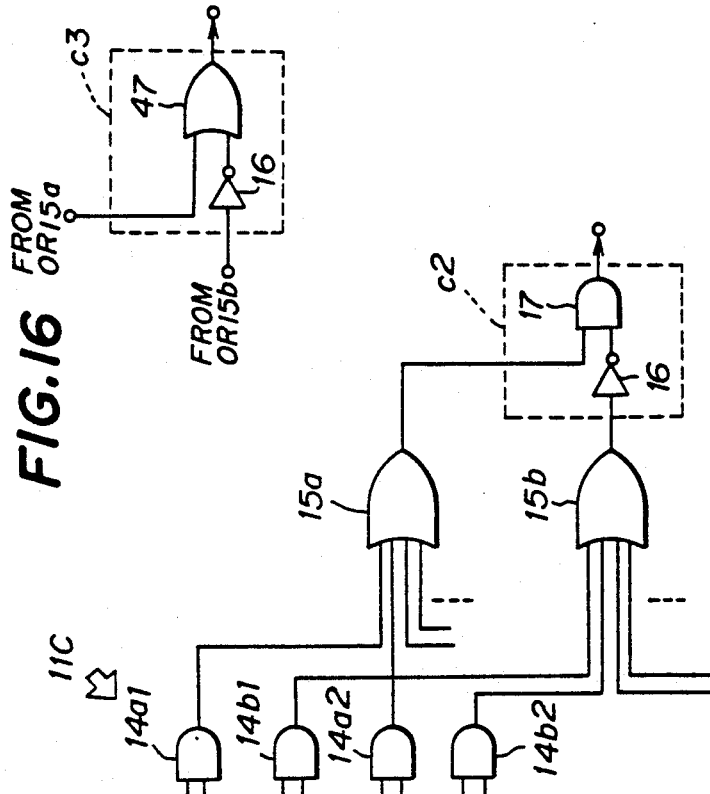
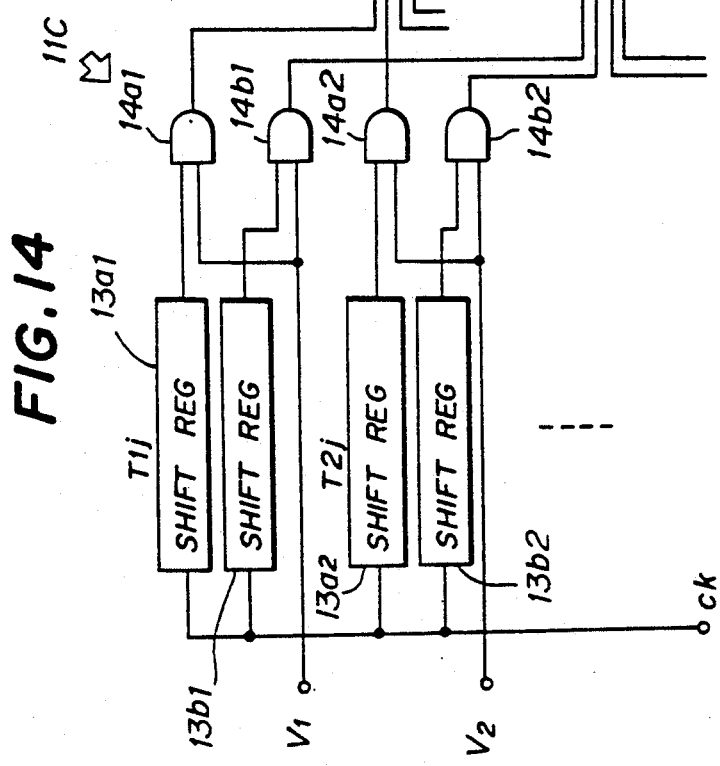
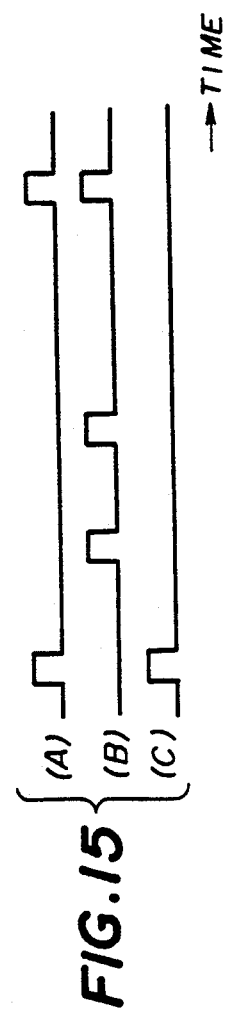

| 64 | 1 | 3 | 7 | 15 | 31 | 63 | 127 | 126 | 125 | 122 | 117 | 106 | 85 | 42 | 84 | 41 | 83 | 38 | 76 |
| 25 | 51 | 103 | 78 | 29 | 59 | 119 | 110 | 93 | 58 | 116 | 105 | 82 | 37 | 75 | 22 | 44 | 88 | 49 | 99 |
| 70 | 13 | 27 | 55 | 111 | 94 | 61 | 123 | 118 | 109 | 90 | 53 | 107 | 86 | 45 | 91 | 54 | 108 | 89 | 50 |
| 100 | 73 | 18 | 36 | 72 | 17 | 35 | 71 | 14 | 28 | 56 | 112 | 97 | 66 | 5 | 11 | 23 | 47 | 95 | 62 |
| 124 | 121 | 114 | 101 | 74 | 21 | 43 | 87 | 46 | 92 | 57 | 115 | 102 | 77 | 26 | 52 | 104 | 81 | 34 | 68 |
| 9 | 19 | 39 | 79 | 30 | 60 | 120 | 113 | 98 | 69 | 10 | 20 | 40 | 80 | 33 | 67 | 6 | 12 | 24 | 48 |
| 96 | 65 | 2 | 4 | 8 | 16 | 32 | | | | | | | | | | | | | |

FIG. 20B

| 64 | 1 | 2 | 4 | 9 | 18 | 36 | 73 | 19 | 38 | 77 | 26 | 52 | 105 | 83 | 39 | 79 | 30 | 61 | 123 |
| 119 | 110 | 92 | 56 | 112 | 97 | 67 | 7 | 15 | 31 | 63 | 127 | 126 | 124 | 120 | 99 | 71 | 14 | 122 | 29 |
| 59 | 118 | 108 | 88 | 49 | 98 | 69 | 10 | 20 | 41 | 82 | 37 | 75 | 23 | 47 | 113 | 62 | 125 | 115 | 117 |
| 106 | 85 | 42 | 84 | 40 | 80 | 33 | 66 | 5 | 11 | 22 | 45 | 91 | 94 | 95 | 111 | 60 | 121 | 103 | |
| 78 | 28 | 57 | 114 | 101 | 74 | 21 | 43 | 86 | 44 | 89 | 51 | 102 | 55 | 24 | 48 | 96 | 65 | 3 | 6 |
| 13 | 27 | 54 | 109 | 90 | 53 | 107 | 87 | 46 | 93 | 58 | 116 | 104 | 81 | 35 | 70 | 12 | 50 | 100 | |
| 72 | 17 | 34 | 68 | 8 | 16 | 32 | | | | | | | | | | | | | |

FIG. 20C

| 64 | 1 | 2 | 4 | 8 | 17 | 34 | 68 | 9 | 19 | 38 | 76 | 24 | 49 | 98 | 69 | 11 | 23 | 46 | 93 |
| 58 | 117 | 107 | 86 | 45 | 91 | 54 | 108 | 88 | 96 | 65 | 3 | 6 | 12 | 25 | 51 | 102 | 77 | 26 |
| 53 | 106 | 84 | 41 | 83 | 39 | 78 | 28 | 57 | 48 | 115 | 103 | 79 | 30 | 61 | 123 | 118 | 109 | 90 | 104 |
| 80 | 33 | 66 | 5 | 10 | 21 | 42 | 85 | 43 | 110 | 87 | 47 | 95 | 62 | 125 | 122 | 116 | 105 | 82 | 74 |
| 20 | 40 | 81 | 35 | 70 | 13 | 27 | 55 | 92 | 119 | 111 | 56 | 113 | 99 | 71 | 15 | 31 | 63 | 127 | 37 |
| 120 | 112 | 97 | 67 | 7 | 14 | 29 | 59 | | 94 | 60 | 121 | 114 | 101 | 75 | 22 | 44 | 89 | 124 | |
| 100 | 73 | 18 | 36 | 72 | 16 | 32 | | | | | | | | | | | | 50 | |

FIG. 20D

| 64 | 1 | 2 | 4 | 8 | 16 | 32 | 65 | 3 | 6 | 12 | 24 | 48 | 97 | 66 | 5 | 10 | 20 | 40 | 81 |
| 35 | 71 | 15 | 30 | 60 | 121 | 114 | 100 | 72 | 17 | 34 | 69 | 11 | 22 | 44 | 89 | 51 | 103 | 78 | 29 |
| 58 | 117 | 106 | 84 | 41 | 83 | 39 | 79 | 31 | 62 | 125 | 122 | 116 | 104 | 80 | 33 | 67 | 7 | 14 | 28 |
| 56 | 113 | 98 | 68 | 9 | 18 | 36 | 73 | 19 | 38 | 77 | 27 | 54 | 109 | 90 | 53 | 107 | 86 | 45 | 91 |
| 55 | 111 | 94 | 61 | 123 | 118 | 108 | 88 | 49 | 99 | 70 | 13 | 26 | 52 | 105 | 82 | 37 | 75 | 23 | 46 |
| 93 | 59 | 119 | 110 | 92 | 57 | 115 | 102 | 76 | 25 | 50 | 101 | 74 | 21 | 42 | 85 | 43 | 87 | 47 | 95 |
| 63 | 127 | 126 | 124 | 120 | 112 | 96 | | | | | | | | | | | | | |

NEURON UNIT AND NEURON UNIT NETWORK

This application is a continuation-in-part application of U.S. patent application entitled "NEURON UNIT AND NEURON UNIT NETWORK", filed Nov. 4, 1992 and assigned Ser. No. 07/971,476, which is a divisional application of U.S. patent application Ser. No. 07/856,645, filed Mar. 24, 1992, now U.S. Pat. No. 5,185,851, which is a divisional application of U.S. patent application Ser. No. 07/550,404, filed Jul. 10, 1990, now U.S. Pat. No. 5,131,073, issued Jul. 14, 1992.

BACKGROUND OF THE INVENTION

The present invention generally relates to neuron unit, and more particularly to a neuron unit which resembles neurons and is applicable to neural computers. The present invention also relates to a neuron unit network which includes a plurality of such neuron units which are coupled to form a hierarchical network structure.

Recently, in order to cope with relatively difficult problems encountered in conventional Neumann computers when carrying out a character recognition, an associative storage, a motion control and the like, various models of neural computers have been proposed. The neural computer resembles a nervous system of a living body so that it is possible to realize a parallel processing and a learning function. Various hardware models have also been proposed to realize the neural computer.

FIG. 1 shows an example of a conventional neuron unit proposed in a Japanese Laid-Open Patent Application No. 62-295188. The neuron unit includes a plurality of amplifiers 1 having an S-curve transfer function, and a resistive feedback circuit network 2 which couples outputs of each of the amplifiers 1 to inputs of amplifiers in another layer as indicated by a one-dot chain line. A time constant circuit 3 made up of a grounded capacitor and a grounded resistor is coupled to an input of each of the amplifiers 1. Input currents $I_1, I_2, \ldots, I_N$ are respectively applied to the inputs of the amplifiers I, and an output is derived from a collection of output voltages of the amplifiers 1.

An intensity of the coupling (or weighting) between the nervous cells is described by a resistance of a resistor 4 (a lattice point within the resistive feedback circuit network 2) which couples the input and output lines of the nervous cells. A nervous cell response function is described by the transfer function of each amplifier 1. In addition, the coupling between the nervous cells may be categorized into excitation and inhibition couplings, and such couplings are mathematically described by positive and negative signs on weighting coefficients. However, it is difficult to realize the positive and negative values by the circuit constants. Hence, the output of the amplifier 1 is divided into two signals, and one of the two signals is inverted so as to generate a positive signal and a negative signal. One of the positive and negative signals derived from each amplifier 1 is appropriately selected.

FIG. 2 shows a modified version of the neuron unit shown in FIG. 1, and this modified version is proposed in a Japanese Laid-Open Patent Application No. 62-295188. In this case, the neuron unit is simplified based on a mathematical analysis. A negative gain amplifier 5 which produces a single output is used in place of the amplifier 1. In addition, a clipped T matrix circuit 6 is used in place of the resistive feedback circuit network 2.

The conventional neuron units shown in FIGS. 1 and 2 are analog circuits. In other words, the input and output quantities are described in current values or voltage values, and all operations within the circuits are carried out in analog form.

However, it is difficult to ensure accurate and stable operation of the analog circuit because the characteristic of the amplifier changes depending on the temperature, a drift occurs during an initial stage of the circuit operation when the power source is turned ON and the like. Particularly in the case of the neuron unit, at least several hundred amplifiers are required, and the operation stability is critical since a non-linear operation is carried out. In addition, it is difficult to change the circuit constants such as the resistances of the resistors, and the flexibility of the circuit for general applications is poor.

In view of the above, a digital neuron unit is proposed in Hirai et al., "Design of a Completely Digital Neuro-Chip", Technical Report of the Electronic Information and Communication Society, ICD88-130. But this digital neuron unit is simply an emulation of the conventional analog neuron unit, and the circuit construction of the digital neuron unit is quite complex in that up-down counters and the like are required. As a result, it is extremely difficult to provide a learning function in the digital neuron unit.

SUMMARY OF THE INVENTION

Accordingly, it is a general object of the present invention to provide a novel and useful neuron unit and a neuron unit network in which the problems described above are eliminated.

Another and more specific object of the present invention is to provide a neuron unit for simultaneously processing a plurality of binary input signals and for outputting an output signal which is indicative of a result of the processing, comprising a plurality of first input lines for receiving first binary input signals which undergo transitions with time, a plurality of second input lines for receiving second binary input signals which undergo transitions with time, first and second memory means for storing weighting coefficients, first gate means for successively obtaining a logical product of one of the first binary input signals received from the first input lines and a corresponding one of the weighting coefficients read out from the first memory means for each of the first binary input signals, second gate means for successively obtaining a logical product of one of the second binary input signals received from the second input lines and a corresponding one of the weighting coefficients read out from the second memory means for each of the second binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit. According to the neuron unit of the present invention, it is possible to guarantee a stable circuit operation without being affected by a temperature change and the like. In addition, since the weighting coefficients are stored in the memory means, it is possible to rewrite the weighting coefficients if necessary.

Still another object of the present invention is to provide a neuron unit for simultaneously processing a plurality of binary input signals and for outputting an output signal which is indicative of a result of the processing, comprising a plurality of input lines for receiving binary input signals which undergo transitions with time, memory means for storing weighting coefficients and corresponding grouping information which indicates one of excitation and inhibition groups to which the weighting coefficients belong, first gate means for successively obtaining a logical product of one of the binary input signals received from the input lines and a corresponding one of the weighting coefficients read out from the first memory means for each of the binary input signals, second gate means for obtaining a logical product of one of the grouping information read out from the memory means and a corresponding one of logical products output from the first gate means for each of the logical products output from the first gate means, third gate means for obtaining a logical product of an inversion of one of the grouping information read out from the memory means and a corresponding one of the logical products output from the first gate means for each of the logical products output from the first gate means, fourth gate means for obtaining a logical sum of logical products output from the second gate means, fifth gate means for obtaining a logical sum of logical products output from the third gate means, and output means including an inverter for inverting the logical sum output from the fifth gate means and a gate for obtaining one of a logical product and a logical sum of the logical sum output from the fourth gate means and an inverted logical sum output from the inverter, where the gate outputs an output signal of the neuron unit.

A further object of the present invention is to provide a neuron unit for simultaneously processing a plurality of binary input signals and for outputting an output signal which is indicative of a result of the processing, comprising a plurality of input lines for receiving binary input signals which undergo transitions with time, first and second memory means for storing weighting coefficients, first gate means for successively obtaining a logical product of one of the binary input signals received from the input lines and a corresponding one of the weighting coefficients read out from the first memory means for each of the binary input signals, second gate means for successively obtaining a logical product of one of the binary input signals received from the input lines and a corresponding one of the weighting coefficients read out from the second memory means for each of the binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit.

Another object of the present invention is to provide a neuron unit network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure. Each of the neuron units simultaneously process a plurality of binary input signals and output an output signal which is indicative of a result of the processing. The neuron unit comprises a plurality of first input lines for receiving first binary input signals which undergo transitions with time, a plurality of second input lines for receiving second binary input signals which undergo transitions with time, first and second memory means for storing weighting coefficients, first gate means for successively obtaining a logical product of one of the first binary input signals received from the first input lines and a corresponding one of the weighting coefficients read out from the first memory means for each of the first binary input signals, second gate means for successively obtaining a logical product of one of the second binary input signals received from the second input lines and a corresponding one of the weighting coefficients read out from the second memory means for each of the second binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit. According to the neuron unit network of the present invention, the circuit construction of the neuron unit network is relatively simple because each neuron unit has a simple circuit construction.

Still another object of the present invention is to provide a neuron unit network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure. Each of the neuron units simultaneously process a plurality of binary input signals and output an output signal which is indicative of a result of the processing. The neuron unit comprises a plurality of input lines for receiving binary input signals which undergo transitions with time, memory means for storing weighting coefficients and corresponding grouping information, the grouping information indicating one of excitation and inhibition groups to which the weighting coefficients belong, first gate means for successively obtaining a logical product of one of the binary input signals received from the input lines and a corresponding one of the weighting coefficients read out from the first memory means for each of the binary input signals, second gate means for obtaining a logical product of one of the grouping information read out from the memory means and a corresponding one of logical products output from the first gate means for each of the logical products output from the first gate means, third gate means for obtaining a logical product of an inversion of one of the grouping information read out from the memory means and a corresponding one of the logical products output from the first gate means for each of the logical products output from the first gate means, fourth gate means for obtaining a logical sum of logical products output from the second gate means, fifth gate means for obtaining a logical sum of logical products output from the third gate means, and output means including an inverter for inverting the logical sum output from the fifth gate means and a gate for obtaining one of a logical product and a logical sum of the logical sum output from the fourth gate means and an inverted logical sum output from the inverter, where the gate outputs an output signal of the neuron unit.

A further object of the present invention is to provide a neuron unit network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure. Each of the neuron units simultaneously process a plurality of binary input signals and output an output signal which is indicative of a result of the processing. The neuron unit comprises a plurality of input lines for receiving binary input signals which undergo transitions with time, first and second memory means for storing weighting coefficients, first gate means for successively obtaining a logical product of one of the binary input signals received from the input lines and a corresponding one of the weighting coefficients read out from the first memory means for each of the binary input signals, second gate means for successively obtaining a logical product of one of the binary input signals received from the input lines and a corresponding one of the weighting coefficients read out from the second memory means for each of the binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit.

Another object of the present invention is to provide a neuron unit for processing a plurality of binary input signals and for outputting a neuron output signal which is indicative of a result of the processing, comprising a plurality of first gate means, respectively for carrying out a logical operation on a binary input signal and a weighting coefficient, a second gate means, coupled to the first gate means, for carrying out a logical operation on an excitatory output signal of each of the firs gate means, a third gate means, coupled to the first gate means, for carrying out a logic operation on an inhibitory output signal of each of the first gate means, a fourth gate means, coupled to the second and third gate means, for synthesizing output signals of the second and third gate means and outputting the neuron output signal, and generating means, coupled to the first gate means, for generating the weighting coefficients which are supplied to each of the first gate means, where the generating means for generating one weighting coefficient includes a random number generator for generating random numbers, and a comparator for comparing each random number r output from the random number generator with a predetermined value r and for outputting a pulse signal having first and second values depending on whether each random number r is such that $r \leq q$ or $r > q$, and each weighting coefficient is described by a pulse density which is defined by at least one of a number of the first values and a number of the second values of the pulse signal within a predetermined time, where the first and second values are arranged at random and the first and second values respectively correspond to high and low binary signal levels. According to the neuron unit of the present invention, it is possible to supply each weighting coefficient in the form of a pulse signal having the first and second values arranged at random to describe its pulse density.

Other objects and further features of the present invention will be apparent from the following detailed description when read in conjunction with the accompanying drawings.

BRIEF DESCRIPTION OF THE DRAWINGS

FIGS. 5(A), 5(B), 6(A) through 6(C), 7(A) through 7(C) and 8(A) through 8(C) are timing charts for explaining the operation of the first and second embodiments;

FIG. 14 is a circuit diagram generally showing a third embodiment of the neuron unit according to the present invention;

FIGS. 15(A) through 15(C) are timing charts for explaining the operation of the third embodiment;

FIG. 16 is a circuit diagram showing an essential part of a modification of the third embodiment;

FIGS. 19A through 19D respectively show bit sequence of the M sequence generated from the random number generators shown in FIGS. 18A through 18D;

FIGS. 20A through 20D respectively show random number sequences generated from the random number generators shown in FIGS. 18A through 18D;

DESCRIPTION OF THE PREFERRED EMBODIMENTS

Figure 3:
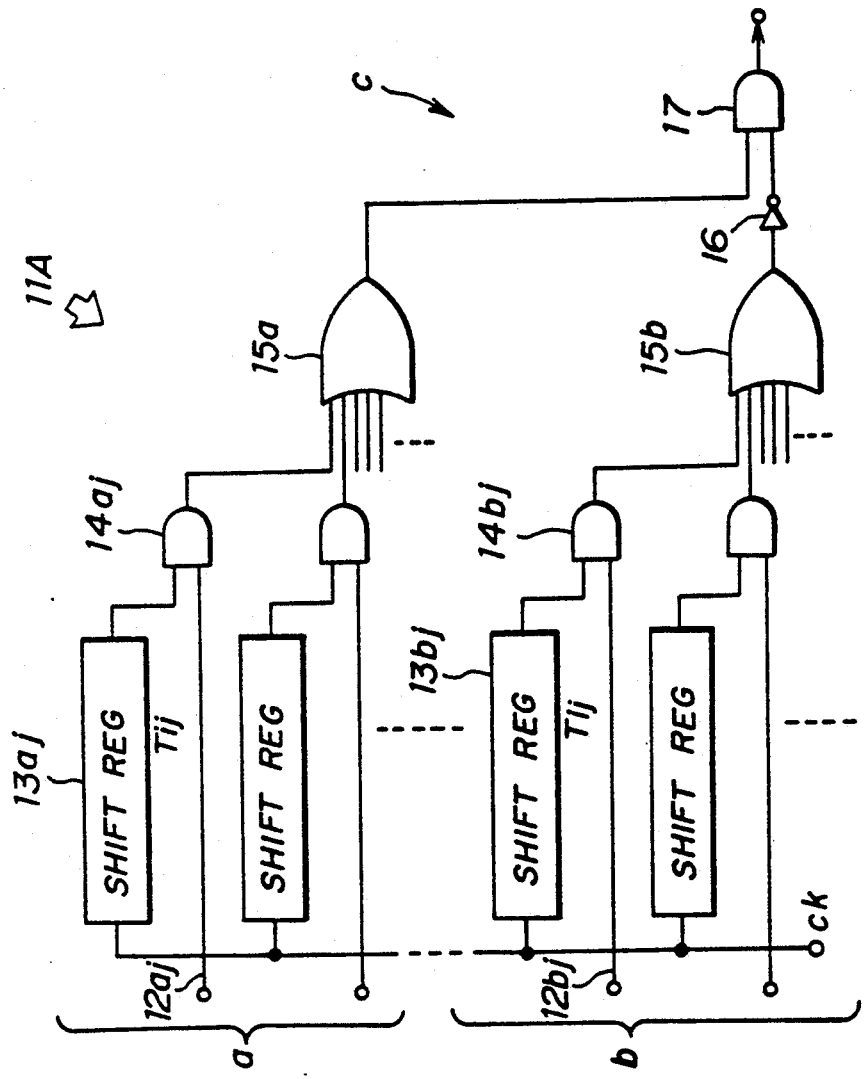
FIG. 3 is a circuit diagram generally showing a first embodiment of a neuron unit according to the present invention.
Figure 4:
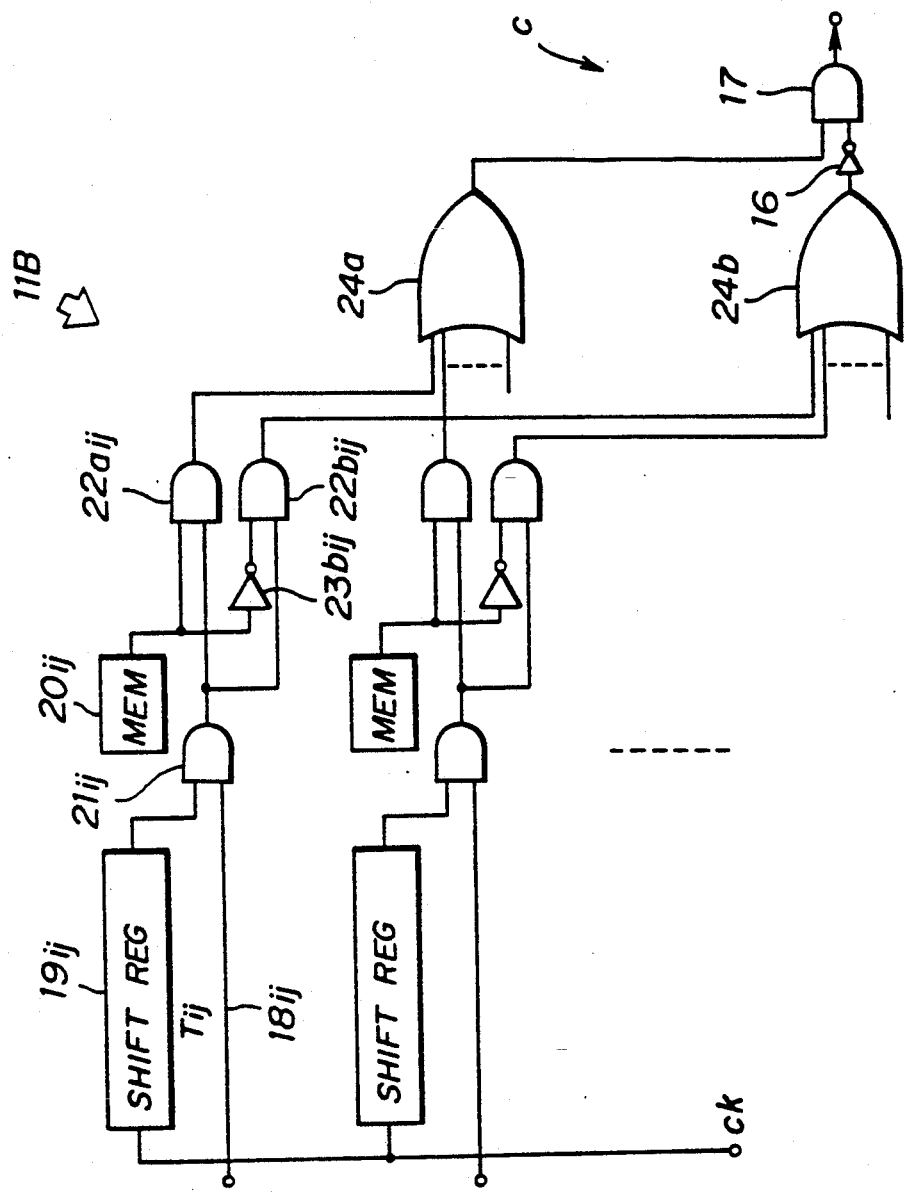
FIG. 4 is a circuit diagram generally showing a second embodiment of the neuron unit according to the present invention.

A description will be first given of circuit constructions of first and second embodiments of a neuron unit according to the present invention, by referring to FIGS. 3 and 4.

FIG. 3 shows the first embodiment. In FIG. 3, a neuron unit 11A resembles nervous cells and generally has an excitation group a, an inhibition group b and an output part c.

The excitation group a includes a plurality of input lines $12a_j$, a plurality of shift registers $13a_j$ which are provided independently for each of the input lines $12a_j$ to store weighting coefficients $T_{ij}$, AND gates $14a_j$ for successively calculating logical products of the input contents from the input lines $12a_j$ and the contents of the shift registers $13a_j$, and an OR gate $15a$ for successively calculating a logical sum of the logical products output from the AND gates $14a_j$.

Similarly, the inhibition group b includes a plurality of input lines $12b_j$, a plurality of shift registers $13b_j$ which are provided independently for each of the input lines $12b_j$ to store weighting coefficients $T_{ij}$, AND gates $14b_j$ for successively calculating logical products of the input contents from the input lines $12b_j$ and the contents of the shift registers $13b_j$, and an OR gate $15b$ for successively calculating a logical sum of the logical products output from the AND gates $14b_j$.

The shift registers $13a_j$ and $13b_j$ respectively function as memories having a storage capacity of two or more bits.

The output part c includes an inverter 16 which receives the logical sum output from the OR gate $15b$ of the inhibition group b, and an AND gate 17 which receives the logical sum output from the OR gate $15a$ of the excitation group a and an output of the inverter 16. The AND gate 17 successively calculates a logical product of the inversion of the logical sum output from the inhibition group b and the logical sum output from the excitation group a.

The operation of the first embodiment will be described later.

FIG. 4 shows the second embodiment. A neuron unit 11B resembles nervous cells and generally has a plurality of input lines $18_{ij}$, a plurality of shift registers $19_{ij}$ for storing weighting coefficients $T_{ij}$, a plurality of 1-bit memories $20_{ij}$ for storing 1-bit group dividing information, AND gates $21_{ij}$ for successively calculating logical products of the input signal contents from the input lines $18_{ij}$ and the contents of the shift registers $19_{ij}$, AND gates $22a_{ij}$ for successively passing the logical products which are obtained from the AND gates $21_{ij}$ and belong to the excitation group depending on the contents of the memories $20_{ij}$, inverters $23b_{ij}$ and AND gates $22b_{ij}$ for successively passing the logical products which are obtained from the AND gates $21_{ij}$ and belong to the inhibition group depending on the contents of the memories $20_{ij}$, an OR gate $24a$ for successively calculating a logical sum of the logical products which are obtained from the AND gates $22a_{ij}$ for the excitation group, an OR gate $24b$ for successively calculating a logical sum of the logical products which are obtained from the AND gates $22b_{ij}$ for the inhibition group, and the output part c.

The shift register $19_{ij}$ and the memory $20_{ij}$ together function as a memory for storing three or more bits of information. The output part c has a structure identical to that of the first embodiment. The AND gate 17 of the output part c successively calculates a logical product of the inversion of the logical sum output from the OR gate $24b$ for the inhibition group and the logical sum output from the OR gate $24a$ for the excitation group.

In the first and second embodiments, the input and output signals are synchronized binary signals. For example, the signals have a binary value "0" or "1". The quantity of an input signal $V_{ij}$ is described by a pulse density, that is, a number of "1"s within a predetermined time. FIGS. 5(A) and 5(B) respectively show the input signal $V_{ij}$ and a synchronizing clock signal ck for a case where information "0.5" is described by the input signal $V_{ij}$. In this case, there are five "1"s and five "0"s within a predetermined time amounting to ten pulses of the synchronizing clock signal ck. It is desirable that the "1"s and "0"s of the input signal $V_{ij}$ are arranged at random.

On the other hand, the weighting coefficient $T_{ij}$ is also described by the pulse density. The weighting coefficient $T_{ij}$ is prestored in the shift registers $13a_j$, $13b_j$ and $19_{ij}$ as a bit sequence of "0"s and "1"s. For example, a binary bit sequence "1001010110" indicates 0.5, and it is desirable that the "0"s and "1"s are arranged at random. The particular method of determining the random arrangement will be described later.

The binary bit sequence which corresponds to the weighting coefficient $T_{ij}$ is successively read out from the shift registers $13a_j$ and $13b_j$ (or the shift register $19_{ij}$)

and is supplied to the AND gates $14a_j$ and $14b_j$ (or the AND gates $21_{ij}$) which respectively obtain the logical product of the input pulse sequence and the binary bit sequence which corresponds to the weighting coefficient $T_{ij}$. Accordingly, the input to the neuron unit 11 which corresponds to an arbitrary ith neuron is defined. That is, when the input signal $V_{ij}$ having the input pulse sequence "1010001011" shown in FIG. 6(A) is input and the binary bit sequence "1001010110" of the weighting coefficient $T_{ij}$ shown in FIG. 6(B) is read out from the shift registers $13a_j$ and $13b_j$ (or the shift registers $19_{ij}$) in synchronism with the input signal $V_{ij}$, a logical product Lp having a bit sequences "1000000010" shown in FIG. 6(C) is obtained from the AND gates $14a_j$ and $14b_j$ (or the AND gates $21_{ij}$). In this case, the input signal $V_{ij}$ is converted by the weighting coefficient $T_{ij}$ into a signal having a pulse density of 0.2. The output pulse density is by approximation a product of the pulse density of the input signal $V_{ij}$ and the pulse density of the weighting coefficient $T_{ij}$, and the weighting coefficient $T_{ij}$ has a function similar to that of the weighting coefficient used in the analog neuron unit. The output pulse density more closely approximates the product as the length of the signal sequences becomes longer and the arrangement of the "0"s and "1"s become more at random. When the pulse sequence of the weighting coefficient $T_{ij}$ is shorter than the input pulse sequence of the input signal $V_{ij}$, it is possible to return to the beginning of the pulse sequence and repeat the read out of pulse sequence of the weighting coefficient $T_{ij}$.

One neuro unit 11 has a plurality of inputs. Hence, there are a plurality of logical products of the input signals $V_{ij}$ and the weighting coefficients $T_{ij}$, and the OR gates 15a and 15b (or 24a and 24b) obtain a logical sum of the logical products. Because the plurality of input signals $V_{ij}$ are synchronized, a logical sum Ls of the products becomes "1110100110" as shown in FIG. 7(C) when a first logical product Lp1 is "1000000010" as shown in FIG. 7(A) and a second logical product Lp2 is "0110100100" as shown in FIG. 7(B), for example. The logical sum is obtained for each of the excitation group and the inhibition group. The logical sum of the logical products obtained for the excitation group and the logical sum of the logical products obtained for the inhibition group are calculated simultaneously. This calculation of the logical sums corresponds to the process of calculating the sum and the non-linear function (sigmoid function) in the conventional analog neuron unit.

As the pulse density becomes smaller, the logical sum of the pulse densities more closely approximates the sum of the pulse densities. However, as the pulse density becomes larger, the logical sum of the pulse densities saturates and less closely approximates the sum of the pulse densities and a non-linear characteristic is obtained. In the case of the logical sum, the pulse density will not become greater than "1" and will not become smaller than "0". In addition, the logical sum displays a monotonous increase and is approximately the same to the sigmoid function.

As described before, there are two types of couplings (or weighting), namely, the excitation and inhibition types. When making numerical calculations. The excitation and inhibition types are described by positive and negative signs on the weighting coefficient. In the case of the conventional analog neuron unit, when the weighting coefficient $T_{ij}$ is the inhibition type and the sign on the weighting coefficient $T_{ij}$ is negative, an inverting amplifier is used to make an inversion and a coupling to another neuron is made via a resistance which corresponds to the weighting coefficient $T_{ij}$.

On the other hand, in the first and second embodiments, the couplings are divided into the excitation group and the inhibition group depending on the positive and negative signs on the weighting coefficient. Then, the calculation up to the part where the logical sum of the input pulse sequence and the pulse sequence of the weighting coefficient is obtained is carried out for each group. Thereafter, a measure is taken so that the neuron unit 11 outputs "1" only when the output of the excitation group is "1" and the output of the inhibition group is "0".

This measure is realized by the output part c shown in FIGS. 3 and 4, that is, by obtained a logical product of a negative of the output of the inhibition group and the output of the excitation group. As a result, it is possible to realize both the excitation type coupling and the inhibition type coupling by the digital neuron unit. FIG. 8(A) shows the output of the excitation group, FIG. 8(B) shows the output of the negative of the output of the inhibition group, and FIG. 8(C) shows the output of the neuron unit 11.

In the first and second embodiments, the shift registers $13a_j$, $13b_j$ and $19_{ij}$ are used, but it is possible to use instead a combination of a memory and a controller which are on the market.

In the first embodiment, the input state is already divided into the excitation group and the inhibition group by providing the input lines $12a_j$ for the excitation group and the input lines $12b_j$ for the inhibition group. In other words, the relationship of the input and the coupling (or weighting) is fixed, and the logical products and logical sums are calculated for each group.

On the other hand, in the second embodiment, the 1-bit information which indicates either the excitation type or inhibition type coupling (or weighting) is pre-stored in each memory 20, and the appropriate calculation is selected depending on the information content of each memory 20. The selection of the appropriate calculation is simply realized by a logic circuit including the inverters $23_{ij}$ and the AND gates $22a_{ij}$ and $22b_{ij}$. Alternatively, a relay or the like may be used to select the appropriate calculation.

The description given heretofore relates to one neuron unit 11. However, in actual practice, a network is formed from a plurality of neuron units 11. For example, the neuron units 11 form a hierarchical network structure shown in FIG. 9 in which an output of one neuron unit 11 of one layer is coupled to each of the neuron units 11 of a next layer via signal lines L. When the network as a whole is synchronized, the same function may be utilized successively to carry out calculations.

Figure 10:
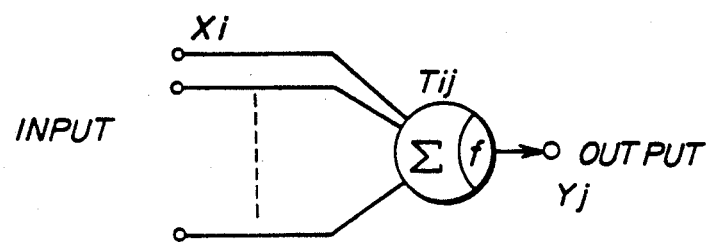
FIG. 10 shows a neuron model.

Next, a description will be given of a method of obtaining the weighting coefficient $T_{ij}$ of the network described above. FIG. 10 shows a neuron model (McCulloch Pitts model) which is often used in numerical calculations. The network described by this model is considered and the back propagation technique is applied thereto. First, the layer structure is made the same as that of the digital circuit by matching the number of layers and number of neurons in each layer. The input to the digital circuit is an analog value from "0" to "1". The weighting coefficient is a positive value in the case of the excitation group and is a negative value in the case of the inhibition group. The following set of formulas (1) is used to calculate the weighting coefficient for the neuron model shown in FIG. 10.

$$y_j = f(\Sigma x_i T_{ij})$$
$$f(x) = 1/(1+e^{-x}) \quad (1)$$

The weighting coefficient is successively calculated for each layer of the network to obtain a final output. The weighting coefficient is initially selected at random. An output $y_i$ is obtained when an input is applied to the digital circuit, and this output $y_i$ is compared with a desirable output $t_i$. The following set of formulas (2) is used to recalculate the weighting coefficient $T_{ij}$.

$$E = (\kappa)\Sigma(y_i - t_i)^2$$
$$\Delta T_{ij} = \delta E/\delta T_{ij} \quad (2)$$

The desired output is obtained when a certain input is applied to the digital circuit by repeating the above described operation. This operation is carried out beforehand on a computer, and the calculated weighting coefficient $T_{ij}$ is converted into a corresponding pulse density. As described above, it is desirable that the pulse intervals of the pulse sequence are at random. When obtaining the pulse sequence from the analog value, a random number is generated within the computer and this random number is compared with the analog value. For example, a value "1" is set when the random value is greater than the analog value and a value "0" is set when the random value is smaller than the analog value, and a desired pulse sequence is obtained by repeating such an operation. The desired pulse sequence is then stored in the shift registers $13a_j$ and $13b_j$ (or the shift registers $19_{ij}$).

Alternatively, the weighting coefficient $T_{ij}$ may be obtained as follows. That is, in the case of the hierarchical network, the following formulas are used to determine the weighting coefficient $T_{ij}$. In this case, the weighting coefficient $T_{ij}$ is initially selected at random.

A) An error signal $\delta$ is calculated from an output obtained in a final output layer and an ideal output. Two error signals $\delta^+$ and $\delta^-$ are used to respectively indicate the positive and negative components of the error because the pulse density cannot take positive and negative values. In other words, the following set of formulas (3) are calculated, where y denotes the output obtained in the final output layer and d denotes the ideal output.

$$\delta^+ = (y \text{ XOR } d) \text{ AND } d$$
$$\delta^- = (y \text{ XOR } d) \text{ AND } y \quad (3)$$

B) The weighting coefficient $T_{ij}$ is newly obtained from the error signal $\delta$ using the following set of formulas (4).

$$\Delta T_{ij}^+ = \delta_i^+ \cap y_i \quad (4)$$
$$\Delta T_{ij}^- = \delta_i^- \cap y_i$$
$$T_{ij}(\text{NEW}) = T_{ij} \cup \Delta T_{ij}^+ \cap \overline{\Delta T_{ij}^-}$$
(For excitation group)
$$T_{ij}(\text{NEW}) = T_{ij} \cup \Delta T_{ij}^- \cap \overline{\Delta T_{ij}^+}$$
(For inhibition group)

C) An error signal which is used for the calculation in a previous layer is obtained from the error signal obtained in A) above using the following set of formulas (5).

$$GP_i = \delta_i^+ \cap T_{ij} \quad (5)$$
$$GM_i = \delta_i^- \cap T_{ij}$$
(For excitation group)
$$GP_i = \delta_i^- \cap T_{ij}$$
$$GM_i = \delta_i^+ \cap T_{ij}$$
(For inhibition group)

D) The error signal is obtained in the previous layer using the following set of formulas (6).

$$\delta_j^+ = \cup_k GP_k \quad (6)$$
$$\delta_j^- = \cup_k GM_k$$

E) Calculation similar to those of B) and C) above are carried out.

F) Furthermore, d and e are calculated in the previous layer and the same calculation is repeated to the first layer.

The above described calculations are repeated on the computer until the output y becomes the ideal output d, and the weighting coefficient $T_{ij}$ is finally obtained. The pulse sequence which corresponds to the obtained weighting coefficient $T_{ij}$ is stored in the shift registers $13a_j$ and $13b_j$ (or the shift registers $19_{ij}$).

On the other hand, the input data generally has an analog value in most cases. Hence, when converting the input data into a pulse sequence, a random number is generated from a random number generator similarly as described above, and the generated random number is compared with the analog value of the input data. A desired pulse sequence corresponding to the input data is obtained by generating a value "1" or "0" depending on whether the analog value is smaller than the random number. The output is also in the form of a pulse sequence, but a corresponding pulse density can be obtained by use of a counter or the like. Of course, the output may be output as it is in the form of the pulse sequence where preferable.

This embodiment describes the signal in the form of the pulse density, and this method of describing the signal is effective not only in actual circuits but also when simulating the circuit operation on the computer. In other words, the operations on the computer are carried out serially, but compared to the calculation of analog values, it is only possible to considerably improve the calculation speed because only logic operations need to be carried out on binary values "1" and "0". Generally, the operations on the four fundamental rules of arithmetics require a large number of machine cycles per calculation, but the logic operation of this embodiment requires only a small number of machine cycles. In addition, there is an additional advantage in that it is easier to use a low-level language for high-speed processing when only logic operations are required.

Figure 9:
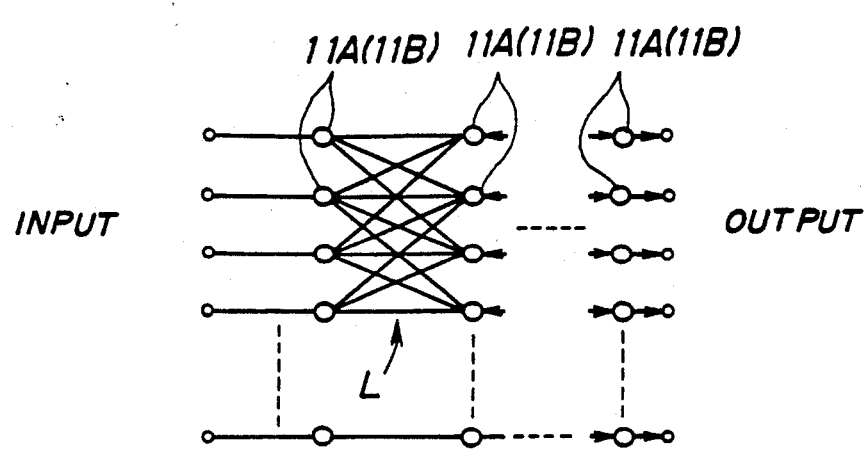
FIG. 9 shows a hierarchical network applied with the first and second embodiments.

Next, a description will be given of the second embodiment for a particular case where 128-bit shift registers are used for the shift registers $19_{ij}$. The content of the shift register $19_{ij}$ is used recursively. The 1-bit information stored in the memory $20_{ij}$ for each input indicates whether the input belongs to the excitation or inhibition group. The 1-bit information has a value "1" to indicate the inhibition group and a value "0" to indicate the excitation group. The neuron units 11B each having the structure shown in FIG. 4 are connected as shown in FIG. 9 to form a network. In this case, there are three layers in the network. A first layer on the input side has 256 neuron units 11B, an intermediate layer has 4 neuron units 11B, and a third layer on the output side has 5 neuron units 11B. In this 3-layer structure, all inputs and outputs of the neuron units 11B are coupled between the first and second layers and between the second and third layers.

Figure 11:
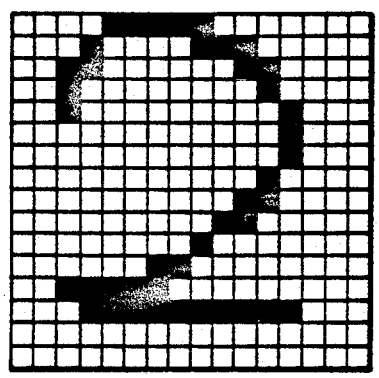
FIG. 11 shows a character which is read for making a character recognition using the second embodiment.

For example, the above described network was used for making a character recognition responsive to a handwritten character input. In this case, the weighting coefficient (content of the shift register $19_{ij}$) is obtained by a computer simulation in the following manner. First, a character shown in FIG. 11 is read by a scanner, and the read image is sectioned into 16×16 meshes. Each mesh including a portion of the character is described by a value "1" while each mesh including no portion of the character is described by a value "0". 256 data are input to the network, and a recognition result is obtained from one of the five neuron units 11B in the third layer which outputs a largest output. When the numbers "1" through "5" are input, the learning takes place so that the neuron unit 11B corresponding to the input number outputs the largest output.

Particularly, each weighting coefficient is obtained and the identification of the excitation coupling (weighting) and inhibition coupling (weighting) is made by the following procedure. First, the network structure including 256 neuron units 11B in the first layer, 4 neuron units 11B in the second layer and 5 neuron units 11B in the third layer is prepared by a computer simulation, and the same inputs are applied to the simulated network structure. Initially, when each weighting coefficient is selected at random, the output result does not necessarily become the desired output. Hence, the set of formulas (2) is used to newly obtain each weighting coefficient, and such an operation is repeated so that the desired output is obtained. An absolute value of the obtained weighting coefficient is converted into the pulse density by the procedure described above and the pulse density is stored in the shift register $19_{ij}$. Since the positive and negative signs on the weighting coefficient distinguish the excitation and inhibition groups, this information is stored in the memory $20_{ij}$. The input is "0" or "1" in this case, and the input pulse sequence has a low level or a high level, and there is no need to provide a special random number generator.

The final output from the third layer is coupled to a light emitting diode (LED) via a transistor, so that the LED turns OFF in response to a low-level output and turns ON in response to a high-level output. The frequency of the synchronizing clock signal ck is set to 1000 kHz, so that the brightness of the LED changes depending on the pulse density. To the human eye, the brightest LED corresponds to the recognition result. The network was used to recognize the characters which were sufficiently taught to the character recognition system on the computer simulation, and it was found that the recognition result obtained from the network was the same as the recognition result obtained by the computer simulation.

Figure 12:
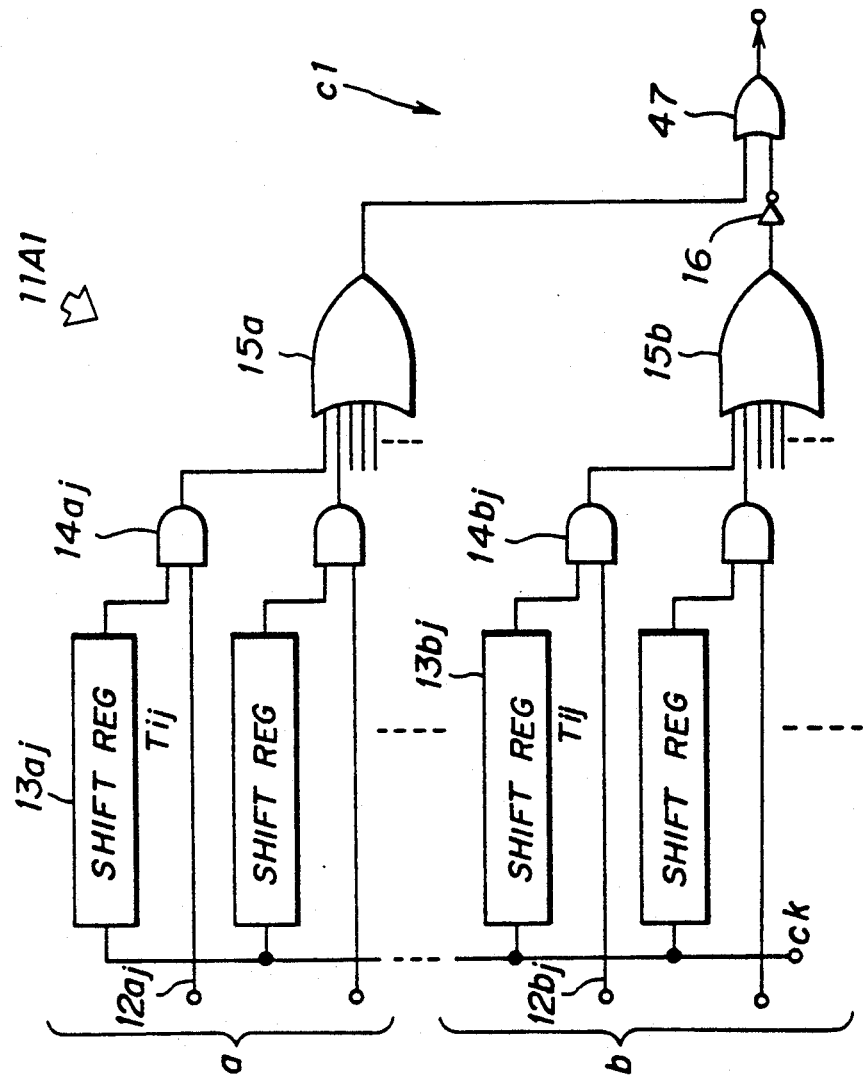
FIG. 12 is a circuit diagram generally showing a modification of the first embodiment.

Next, a description will be given of a modification of the first embodiment, by referring to FIG. 12. In FIG. 12, those parts which are the same as those corresponding parts in FIG. 3 are designated by the same reference numerals, and a description thereof will be omitted. In a neuron unit 11A1, an OR gate 47 is provided in an output part c1 in place of the AND gate 17 of the output part c. In this modification, the OR gate 47 obtains a logical sum of the inverted logical sum of the excitation group obtained from the OR gate 15a and the logical sum of the inhibition group obtained from the OR gate 15b.

Figure 13:
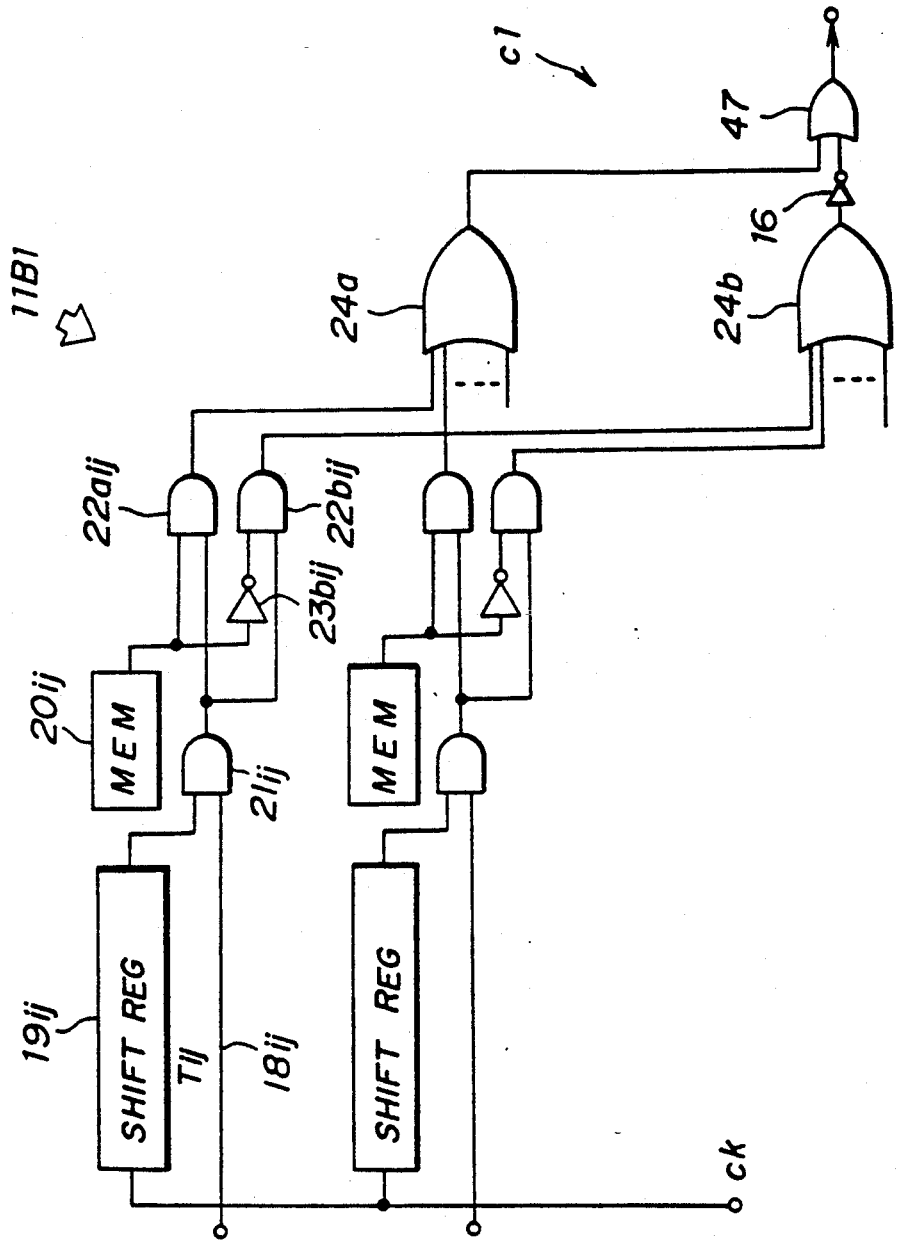
FIG. 13 is a circuit diagram generally showing a modification of the second embodiment.

FIG. 13 shows a modification of the second embodiment. In FIG. 13, those parts which are the same as those corresponding parts in FIG. 4 are designated by the same reference numerals, and a description thereof will be omitted. In a neuron unit 11B1, the output part c1 is used in place of the output part c, similarly to the modification of the first embodiment. In this modification, the OR gate 47 obtains a logical sum of the inverted logical sum of the excitation group obtained from the OR gate 24a and the logical sum of the inhibition group obtained from the OR gate 24b.

Next, a description will be given of a third embodiment of the neuron unit according to the present invention, by referring to FIG. 14. In FIG. 14, those parts which are substantially the same as those corresponding parts in FIG. 3 are designated by the same reference numerals, and a description thereof will be omitted.

In FIG. 14, input signals $V_1, V_2, \ldots$ are described in pulse densities, that is, the number of "1" s within a predetermined time.

In a neuron unit 11C shown in FIG. 14, an output part c2 is made up of the inverter 16 and the AND gate 17. The inverter 16 inverts the logical sum output from the OR gate 15b for the inhibition group. The AND gate 17 obtains a logical product of the logical sum output from the OR gate 15a for the excitation group and an inverted logical sum output from the inverter 16.

The basic operation of this embodiment can be readily understood from the operation of the first embodiment. In this embodiment, however, as shown in FIG. 15(C), the output part c2 is designed to output a value "1" and only when the logical sum output from the OR gate 15a shown in FIG. 15(A) is "1" and the logical sum output from the OR gate 15b shown in FIG. 15(B) is "0". Otherwise, the output part c2 outputs a value "0" as shown i FIG. 15(C).

FIG. 16 shows an essential part of a modification of the third embodiment. In FIG. 16, an output part c3 is made up of the inverter 16 and the OR gate 47. The inverter 16 inverts the logical sum output from the OR gate 15b for the inhibition group. The OR gate 47 obtains a logical sum of the logical sum output from the OR gate 15a for the excitation group and an inverted logical sum output from the inverter 16. Hence, the output part c3 outputs a value "0" only when both outputs of the OR gate 15a and the inverter 16 are "0", and otherwise outputs a value "1".

In the embodiments described above, each shift register which stores the weighting coefficient $T_{ij}$ must have a number of bits corresponding to the required pulse length because the weighting coefficient $T_{ij}$ is described by a random pulse sequence (train). If the calculations or operations are to be carried out with a high accuracy, it is essential that the pulse length is set long. For example, if the signal accuracy of 7 bits is considered, the random pulse sequence must have a bit length (pulse length) of 128 ($=2^7$) bits. In this case, in order to store the weighting coefficient $T_{ij}$, each corresponding shift register must have 128 bits.

In the neuron unit network which is made up of a plurality of neuron units which are coupled, the number of neuron units which are coupled is several hundred to several thousand, for example. For this reason, an extremely large number of shift registers or memory means having the relatively large bit length is required to store all of the weighting coefficients $T_{ij}$. Therefore, the scale of the hardware becomes large and the production cost becomes high. As a result, when the neuron units are formed on a semiconductor integrated circuit device, the number of neuron units which can be formed on the chip area becomes extremely limited. On the other hand, the amount of data to be transferred for the purpose of initially setting each weighting coefficient $T_{ij}$ into the corresponding shift register or memory means becomes extremely large, thereby requiring a very long time to complete the initial setting operation.

Accordingly, a description will hereinafter be given of embodiments in which the above described problems are eliminated.

Figure 17:
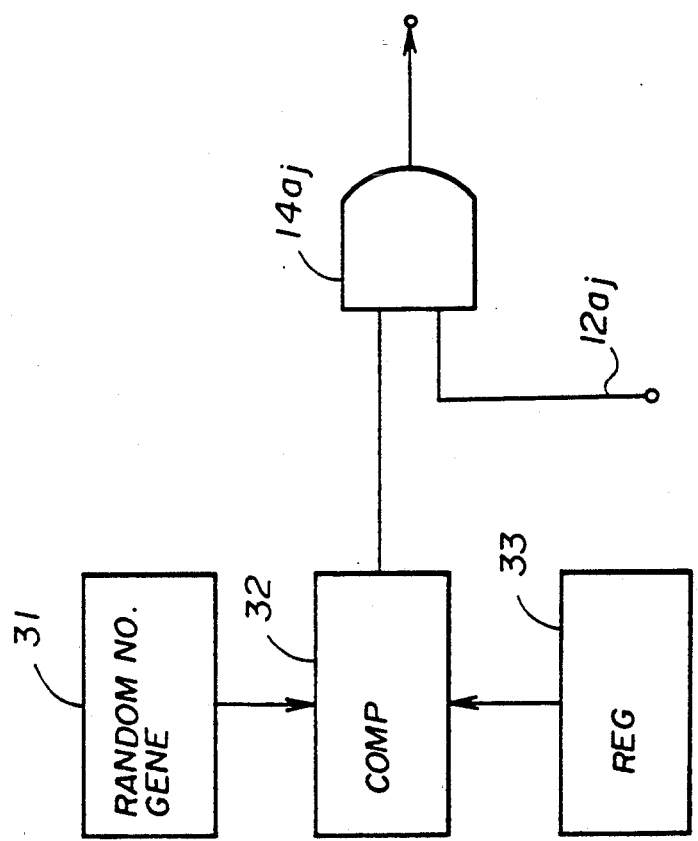
FIG. 17 is a system block diagram showing an essential part of a fourth embodiment of the neuron unit according to the present invention.

FIG. 17 shows an essential part of a fourth embodiment of the neuron unit according to the present invention. In FIG. 17, those parts which are the same as those corresponding parts in FIG. 3 are designated by the same reference numerals, and a description thereof will be omitted.

In this embodiment, a random number generator 31, a comparator 32 and a register 33 are provided in place of a shift register $13_{aj}$ shown in FIG. 3. The random number generator 31 generates a random number and supplies the random number to the comparator 32. On the other hand, the register 33 stores a binary data corresponding to the weighting coefficient $T_{ij}$. The comparator 32 compares the random number from the random number generator 31 with the data from the register 33, and outputs a pulse indicative of the comparison result to the AND gate $14_{aj}$. As a result, a random pulse sequence having a pulse density corresponding to the binary data stored in the register 33, that is, the weighting coefficient $T_{ij}$, is output from the comparator 32.

For example, if the random number generator 31 generates a 7-bit random number from "1" to "127" and the register 33 stores a 7-bit data indicating "30", the comparator 32 can be designed to output a data "1" if the 7-bit random number is less than or equal to "30". In this case, the random number generator 31 generates a number which is less than or equal to "30" 30 times in one random number generation period in which the number from "1" to "127" and excluding "0" is generated once at random. Hence, the comparator 32 outputs a random pulse sequence having a pulse density of "30/127", that is, a random pulse sequence in which the data "1" appears 30 times at random within one random number generation period.

Compared to the case where a 128-bit shift register $13_{aj}$ is used, this embodiment merely requires a 7-bit register 33. Accordingly, it is possible to simplify both the circuit construction and the operation of setting the initial value into the register 33. Although this embodiment uses the random number generator 31 and the comparator 32 in addition to the register 33, the increase in the hardware is small compared to the large hardware reduction that can be achieved by using the 7-bit register 33 in place of the 128-bit shift register $13_{aj}$, particularly when the large number of registers used is taken into consideration.

Of course, the circuit part made up of the random number generator 31, the comparator 32 and the register 33 may be used in place of the shift registers of the other embodiments described above, namely, the shift registers $19_{ij}$ and $13a1$.

Figure 18A:
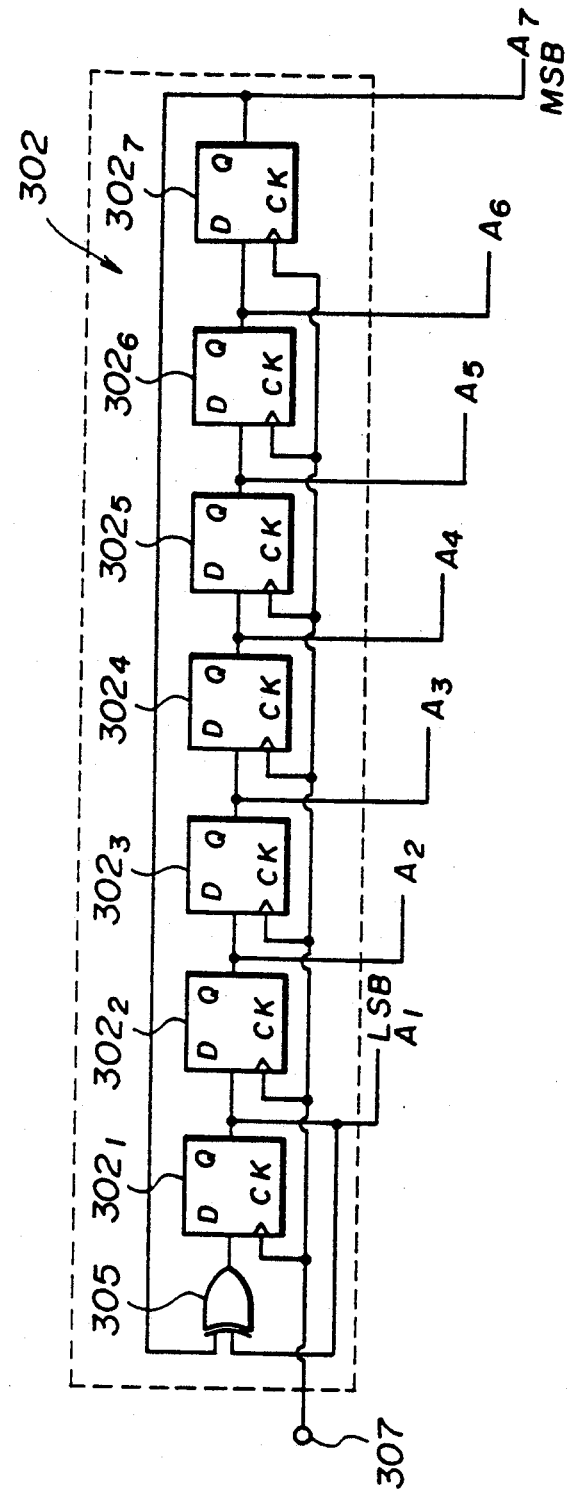
FIGS. 18A through 18D are circuit diagrams respectively showing a first embodiment of a random number generator shown in FIG. 17 with slightly different connections.

FIG. 18A shows a first embodiment of the random number generator 31. In FIG. 18, the random number generator 31 includes an exclusive-OR gate 305 and 7 flip-flops $302_1$ through $302_7$ which are connected as shown. A clock signal is input to a terminal 307 and is applied to clock terminals CK of each of the flip-flops $302_1$ through $302_7$. The 7 flip-flops $302_1$ through $302_7$ form a 7-bit linear feedback shift register (LFSR) 302 together with the exclusive-OR gate 305. An initial value is set in the LFSR 302, and the LFSR 302 thereafter repeats a shift operation. As a result, a number from "1" to "127" and excluding "0" is generated once at random within one random number generation period. This random number which is generated from the LFSR 302 is defined by bits $A_1$ through $A_7$, where $A_7$ denotes the most significant bit (MSB) and $A_1$ denotes the least significant bit (LSB), for example. However, the bits $A_7$ and $A_1$ may respectively denote the LSB and the MSB.

Figure 18B:
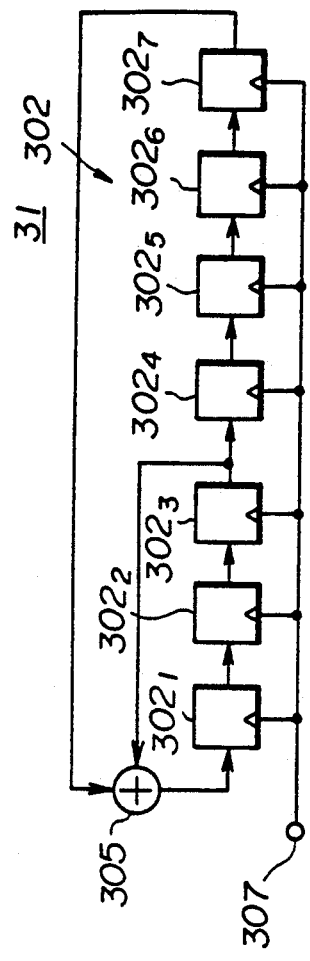
Figure 18C:
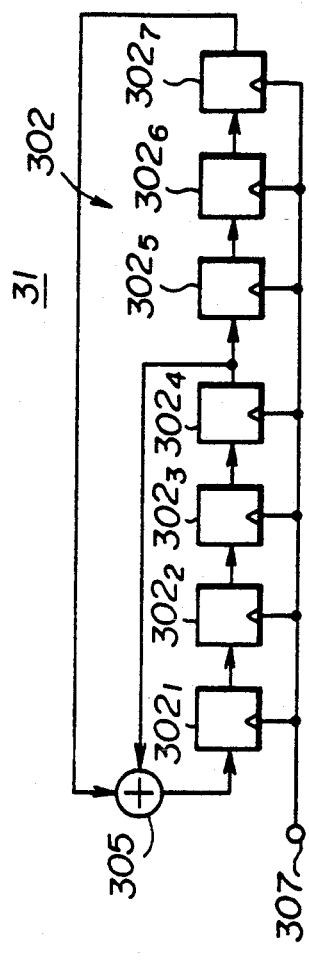
Figure 18D:
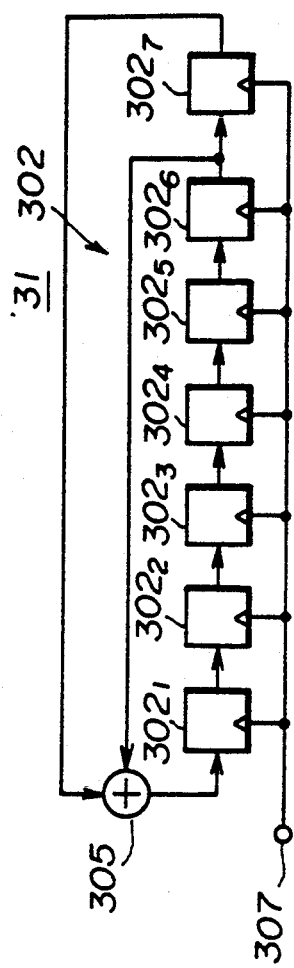

The output of the flip-flop $302_1$ is input to the exclusive-OR gate 305 in FIG. 18, but the output of any of the flip-flops $302_1$ through $302_6$ may be input to the exclusive-OR gate 305 as shown in FIGS. 18B through 18D.

Next, a description will be given of the reason why the random pulse sequence generated from the random number generators 31 shown in FIGS. 18A through 18D actually becomes regular to a certain extent The random number generators 31 shown in FIGS. 18B through 18D constructions which are basically the same as that of the random number generator 31 shown in FIG. 18A, except for one of the signals input to the exclusive-OR gate 305.

If the bit stored in the flip-flop $302_1$ at a time t is denoted by $A_t$, a bit $A_{(t-i+j)}$ which is stored in the flip-flop $302_1$ a time $i-j$ before is stored in the flip-flop $302_{1+i}$ at a time $(t+j)$. Hence, a bit $A_{(t-i-1)}$ is stored in the flip-flop $302_{1+1}$ at a time $(t-1)$.

For example, in the case of the random number generator 31 shown in FIG. 18C, the bit $A_t$ stored in the flip-flop $302_1$ of the first stage is the value which is output from the exclusive-OR gate 305 based on the bits stored in the flip-flops $302_4$ and $302_7$ of the fourth and seventh stages at the time $(t-1)$. Because the exclusive-OR gate 305 carries out a modulo-2 addition of the bits, the bit $A_t$ stored in the flip-flop $302_1$ of the first stage can be described by the following formula (7), where "mod2" denotes a modulo-2 addition.

$$A_t = A_{(t-4)} + A_{(t-7)} \pmod{2} \tag{7}$$

When setting an initial value into the LFSR 302 having 7 stages, each of the 7 bits can either take the value "0" or "1" and there are $2^7 = 128$ possible initial values. If all of the 7 bits of the initial value are "0", the value output from the LFSR 302 will not change, and the value "0000000" is excluded from the initial value. If at least one of the 7 bits of the initial value has the value "1", the value output from the LFSR 302 will successively change to one of the 127 possible values with a predetermined period.

If the bit $A_t$ stored in the flip-flop $302_1$ of the first stage can be described by the formula (7), it is known that the bit sequence of the bit $A_t$ is a pseudo random sequence having a period $(2^7 - 1)$. In other words, each of the random number generators 31 shown in FIGS. 18A through 18D can generate $(2^7 - 1)$ bit sequences in one period, and it is thus possible to output integers from "1" to "127" by reading the 7 bits of the bit sequences as a binary number.

When reading the bit sequences output from the random number generator 31 as the binary number, it is possible to consider the bit $A_1$ output from the first stage as the LSB and the bit $A_7$ output from the last (seventh) stage as the MSB or vice versa. But for the sake of convenience, it will be assumed hereunder that the bit $A_1$ output from the first stage is the LSB and the bit $A_7$ output from the last stage is the MSB of the binary value.

If it is assumed that $c_i(=1, 2, \ldots, p)$ is an integer "0" or "1", where $c_p=1$, a recurrence formula which describes $A_t$ by $c_i$ becomes as follows.

$$A_t = c_1 A_{(t-1)} + c_2 A_{(t-2)} + \ldots + c_p A_{(t-p)} \quad (\text{mod} 2) \qquad (8)$$

A characteristic polynomial of this recurrence formula (8) can be described as follows.

$$f(x) = 1 + c_1 x + c_2 x^2 + \ldots + c_p x^p \qquad (9)$$

A random number sequence which is made up of random pulses generated by the recurrence formula (8) has a period which is $2^p - 1$ or less in length, and the characteristic polynomial which has a maximum period within this range is called a primitive polynomial. The bit sequence of $A_t$ generated by such a primitive polynomial and having the period of $2^p - 1$ is called a p order maximum length linearly recurring sequence (hereinafter simply referred to as a M sequence).

For example, the bit sequence of $A^t$ generated by the formula (7) can be described by a seventh order M sequence corresponding to the primitive polynomial $f(x) = 1 + x^4 + x^7$. In the case of the random number generators 31 using the LFSR 302 having 7 stages and generating the bit sequence of the seventh order M sequence, the number of kinds of random number generators 31 is limited to 4 as shown in FIGS. 18A through 18D. The primitive polynomial and the recurrence formula of each of the random number generators 31 shown in FIGS. 18A through 18D are shown below.

---
[A] Random number generator 31 shown in FIG. 18A:
Primitive Polynomial: $f(x) 1 + x + x^7$
Recurrence Formula: $A_t = A_{(t-1)} + A_{(t-7)}$ (mod2)
Bit Sequence of M sequence: FIG. 19A
Generated Random Number Sequence: FIG. 20A
[B] Random number generator 31 shown in FIG. 18B:
Primitive Polynomial: $f(x) 1 + x^3 + x^7$
Recurrence Formula: $A_t = A_{(t-3)} + A_{(t-7)}$ (mod2)
Bit Sequence of M sequence: FIG. 19B
Generated Random Number Sequence: FIG. 20B
[C] Random number generator 31 shown in FIG. 18C:
Primitive Polynomial: $f(x) 1 + x^4 + x^7$
Recurrence Formula: $A_t = A_{(t-4)} + A_{(t-7)}$ (mod2)
Bit Sequence of M sequence: FIG. 19C
Generated Random Number Sequence: FIG. 20C
[D] Random number generator 31 shown in FIG. 18D:
Primitive Polynomial: $f(x) 1 + x^6 + x^7$
Recurrence Formula: $A_t = A_{(t-6)} + A_{(t-7)}$ (mod2)
Bit Sequence of M sequence: FIG. 19D
Generated Random Number Sequence: FIG. 20D
---

Therefore, the random number generators 31 shown in FIGS. 18A through 18D respectively generate bit sequences of the M sequence such that the period of the random pulses becomes a maximum, and the random nature of the generated pulses in each period is extremely satisfactory. Since it is known beforehand that the period of the bit sequence output from such random number generators 31 is a maximum, it is possible to generate signals having random pulse positions by modulating the generated pulses by the pulse density or the number of pulses.

For example, in the case where a signal having a pulse density of 10/127 is demanded of the random number generator 31 which generates 127 random numbers, it is possible to generate a signal having random pulse positions and the pulse density of 10/127 by outputting the random pulses if the number generated is "1" to "10" and blocking the random pulses if the number generated is "11" to "127". This signal passing and blocking functions can be realized by the comparator 32 shown in FIG. 17, for example.

As described above, the random number generator 31 can make the period of the pseudo random pulses or the random numbers a maximum because the bit sequence of the M sequence is generated. However, the pulses generated from the random number generator 31 are pseudo random pulses and are reproducible. In other words, when the random number generators 31 are driven continuously, the same pulses are output after each period, and the random nature of the generated pulses over a plurality of periods is poor.

Next, a description will be given of other embodiments of the random number generator 31 in which the random nature of the pulses generated over a plurality of periods is improved.

Figure 21:
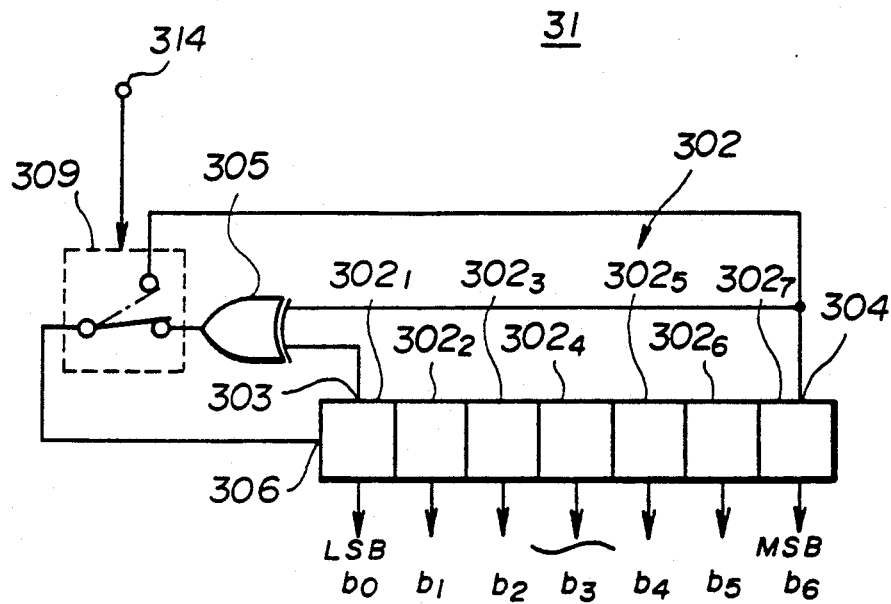
FIG. 21 is a circuit diagram showing a second embodiment of the random number generator.

FIG. 21 shows a second embodiment of the random number generator 31. In FIG. 21, those parts which are the same as those corresponding parts in FIGS. 18A through 18D are designated by the same reference numerals, and a description thereof will be omitted. In FIG. 21, the illustration of the signal lines for inputting the clock signal will be omitted so as to simplify the drawing.

In FIG. 21, a switching circuit 309 receives the bit $b_6$ output from an output part 304 of the flip-flop $302_7$ of the last stage and the output of the exclusive-OR gate 305, and selectively outputs one of these signals in response to a control signal which is received from a terminal 314. The output of the switching circuit 309 is supplied to an input part 306 of the flip-flop $302_1$ of the first stage. In this case, the exclusive-OR gate 305 receives the bits $b_0$ and $b_6$ respectively output from the output parts 303 and 304 of the flip-flops $302_1$ and $302_7$. Hence, the LFSR 302 is formed by the flip-flops $302_1$ through $302_7$, the exclusive-OR gate 305 and the switching circuit 309.

Figure 22:
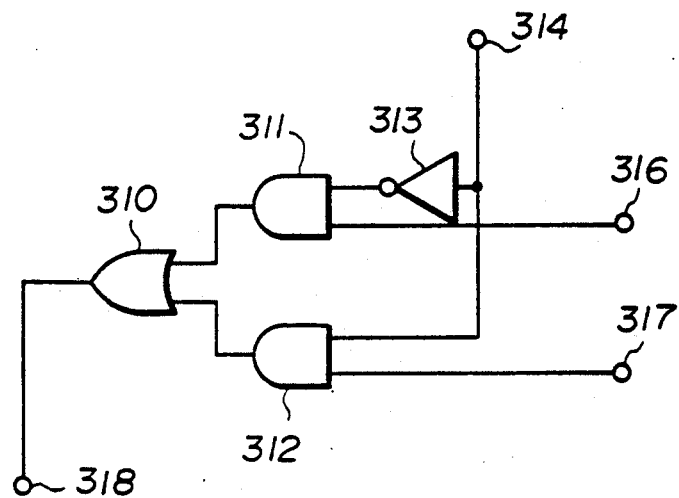
FIG. 22 is a circuit diagram showing an embodiment of a switching circuit shown in FIG. 21.

FIG. 22 shows an embodiment of the switching circuit 309. This switching circuit 309 includes an OR gate 310, AND gates 311 and 312, and an inverter 313 which are connected as shown. The control signal is input to the terminal 314, and the bits $b_0$ and $b_6$ output from the output parts 303 and 304 of the flip-flops $302_1$ and $302_7$ are respectively input to terminals 317 and 316. An output of the OR gate 310 is output from a terminal 318 and is supplied to the input part 306 of the flip-flop $302_1$ as the output of the switching circuit 309.

Normally, the switching circuit 309 selectively outputs the output of the exclusive-OR gate 305 in response to the control signal. In this case, the connection of the random number generator 31 shown in FIG. 21 is the same as that shown in FIG. 18A. But since the random pulses will be repeated periodically if this connection is fixed, this embodiment switches the connection of the switching circuit 309 in response to the control signal after a predetermined number of bits are shifted in the LFSR 302.

For example, this predetermined number of bits corresponds to the number of bits which are shifted in the LFSR 302 during one period of the random pulses. When the connection of the switching circuit 309 is switched to selectively output the bit $b_6$ from the flip-flop $302_7$, the initial value set in the LFSR 302 after one period of the random pulses is changed from the original initial value by shifting an arbitrary number of bits in the LFSR 302. Thereafter, the connection of the switching circuit 309 is returned to selectively output the output of the exclusive-OR gate 305. Therefore, it is possible to guarantee the random nature of the random pulses over a plurality of periods of the random pulses.

Next, a description will be given of the operation of the random number generator 31 shown in FIG. 21, by referring to FIG. 23.

Figure 23:
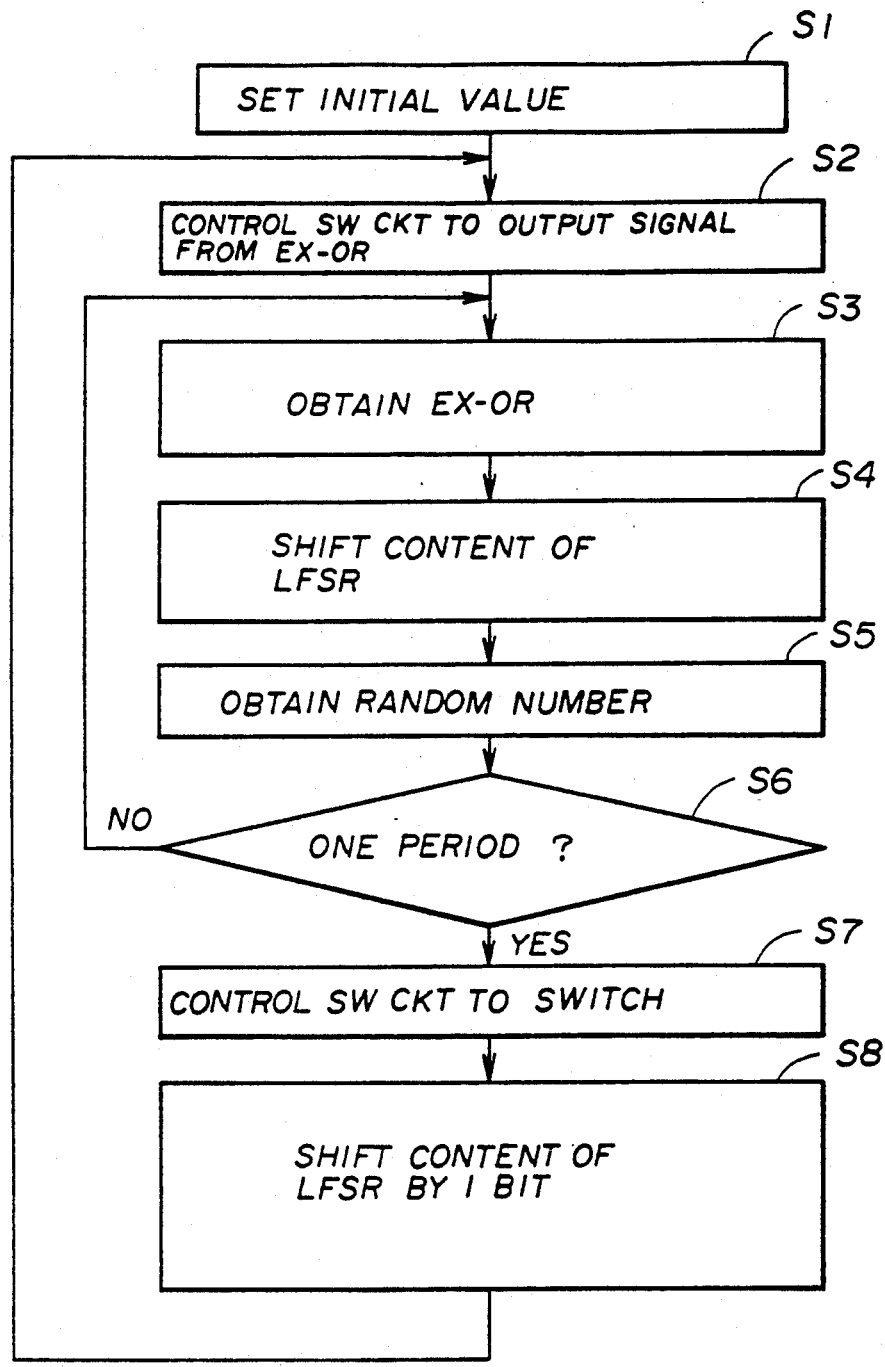
FIG. 23 is a flow chart for explaining the operation of the second embodiment of the random number generator.

In FIG. 23, a step S1 sets a predetermined binary value in the LFSR 302 from an external unit (not shown) via the input part 306 of the flip-flop $302_1$ of the first stage. A step S2 supplies the control signal to the switching circuit 309 via the terminal 314 so that the output of the exclusive-OR gate 305 is coupled to the input part 306 of the flip-flop $302_1$ via the switching circuit 309, and applies the clock signal to the clock terminals of the flip-flops $302_1$ through $302_7$ so as to successively shift the bits in the LFSR 302 in response to the clock signal. A step S3 obtains the exclusive-OR of the bit output from the flip-flop $302_1$ of the first stage and the bit output from the flip-flop $302_7$ of the last stage, thereby feeding back the output of the exclusive-OR gate 305 to the input part 306 of the flip-flop $302_1$ of the first stage. A step S4 successively shifts the content of the LFSR 302 while inputting the output of the exclusive-OR gate 305. As a result, a step S5 generates random numbers or pulses described by each content of the LFSR 302. The generated random numbers are described by binary numbers, but may be converted into decimal numbers ranging from "1" to "127".

A step S6 decides whether or not one period of the random pulses have been generated. The process returns to the step S3 if the decision result in the step S6 is NO. On the other hand, if the decision result in the step S6 is YES, a step S7 supplies the control signal to the switching circuit 309 via the terminal 314 so as to switch the connection of the switching circuit 309 for a certain time. As a result, the switching circuit 309 selectively outputs the output of the flip-flop $302_7$ of the last stage to the flip-flop $302_1$ of the first stage. In this particular case, the certain time is set so that the content of the LFSR 302 is shifted by 1 bit. Hence, a step S8 applies the clock signal to the flip-flops $302_1$ through $302_7$ and shifts the content of the LFSR 302 by 1 bit so as to set a new initial value which is different from the original initial value, and the process returns to the step S2. Of course, the step S8 may shift the content of the LFSR 302 by an arbitrary number of bits by appropriately setting the certain time in the step S7.

Therefore, after one period of the random pulses, the original initial value set in the LFSR 302 is changed to a new initial value which is different from the original initial value. For this reason, the random nature of the random pulses generated from the random number generator 31 shown in FIG. 21 is improved compared to that of the random number generators 31 shown in FIGS. 18A through 18D.

Figure 1:
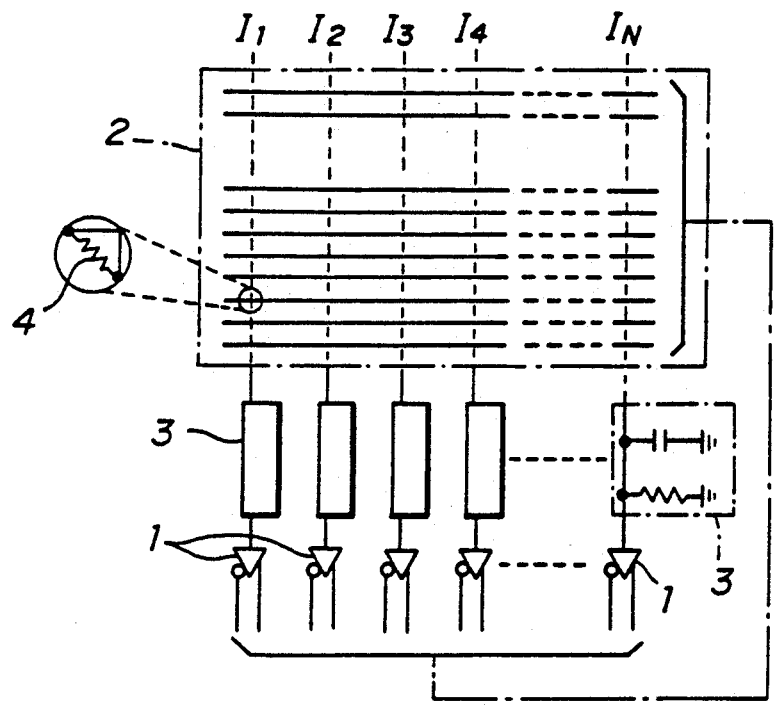
FIG. 1 is a circuit diagram generally showing an example of a conventional analog neuron unit.
Figure 2:
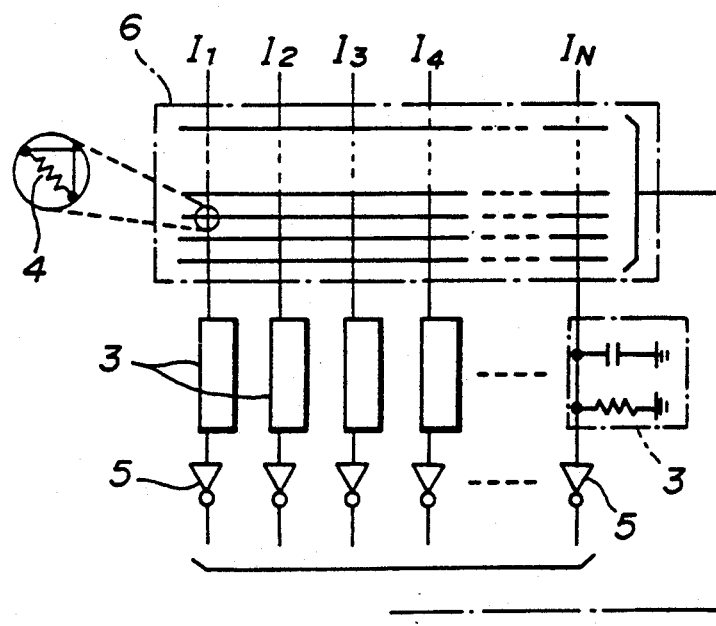
FIG. 2 is a circuit diagram generally showing another example of a conventional analog neuron unit.

The exclusive-OR gate 305 shown in FIG. 2 receives the outputs of the flip-flops $302_1$ and $302_7$. However, the exclusive-OR gate 305 may receive the outputs of the flip-flop $302_7$ and a flip-flop other than the flip-flop $302_1$, as may be readily understood from the random number generators 31 shown in FIGS. 18A through 18D described above. Furthermore, the connection of the switching circuit 309 may be switched before one period of the random pulses elapses.

Figure 24:
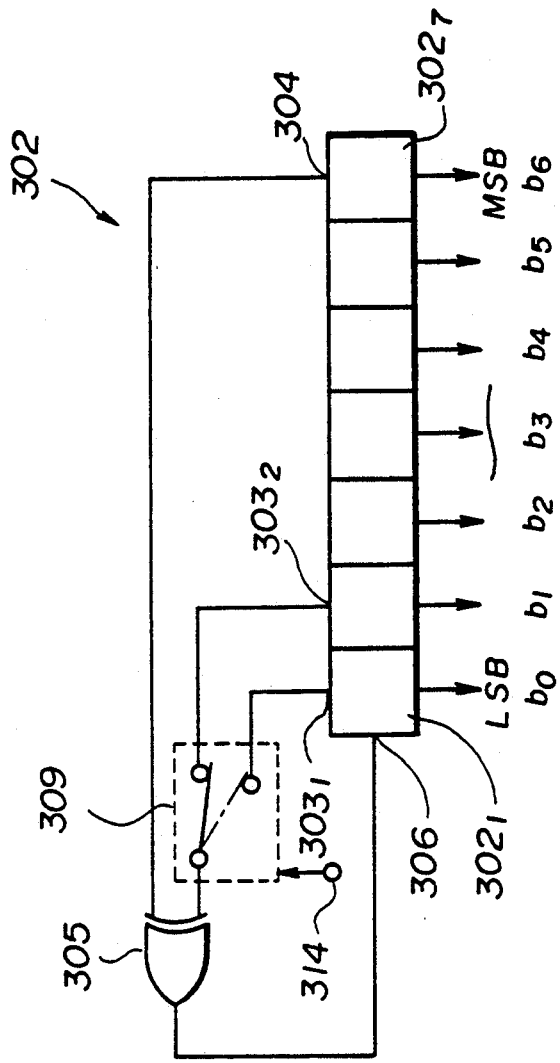
FIG. 24 is a circuit diagram showing a third embodiment of the random number generator.

Next, a description will be given of a third embodiment of the random number generator 31, by referring to FIG. 24. In FIG. 24, those parts which are the same as those corresponding parts in FIG. 21 are designated by the same reference numerals, and a description thereof will be omitted.

In FIG. 24, the switching circuit 309 is coupled between one of the inputs of the exclusive-OR gate 305 and the output parts $303_1$ and $303_2$ of the flip-flops $302_1$ and $302_2$. The switching circuit 309 selectively outputs the output from one of the flip-flops $302_1$ and $302_2$ in response to the control signal which is received via the terminal 314, and the connection of the switching circuit 309 is switched for every period of the random pulses. The exclusive-OR gate 305 receives the output of the switching circuit 309 and the output of the flip-flop $302_7$, and supplies the output thereof to the flip-flop $302_1$ of the first stage.

According to the random number generator 31 shown in FIG. 24, it is possible to change the inputs of the exclusive-OR gate 305 for every one period of the random pulses. As a result, the period of the random pulses effectively becomes approximately twice those of the random number generators 31 shown in FIGS. 18A through 18D, and the random character of the random pulses is improved.

Of course, the output parts which are connected to the switching circuit 309 is not limited to the output parts $303_1$ and $303_2$ of the flip-flops $302_1$ and $302_2$, and the output parts of other flip-flops may be used.

Next, a description will be given of an embodiment of a random pulse generator, by referring to FIG. 25.

Figure 25:
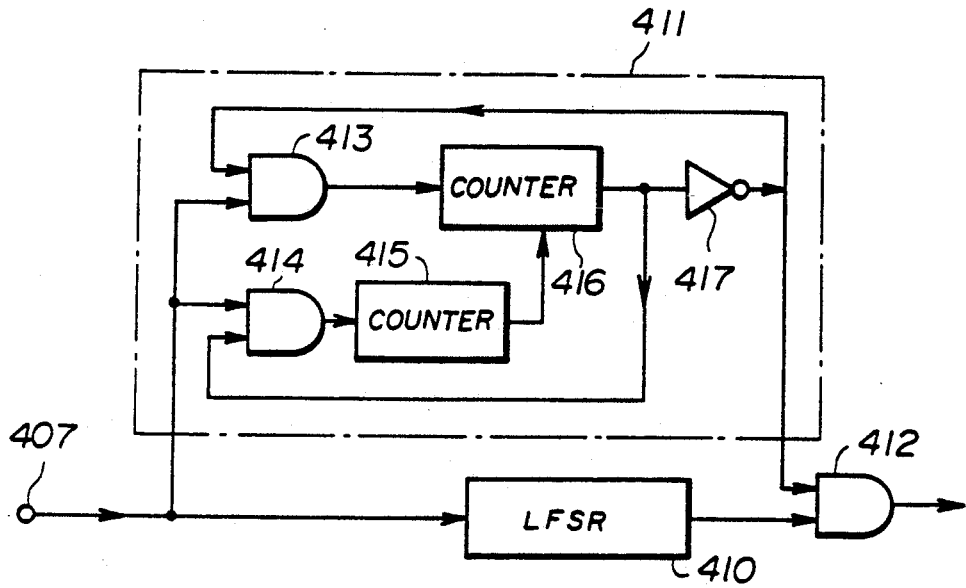
FIG. 25 is a circuit diagram showing an embodiment of a random pulse generator.

The random pulse generator 431 shown in FIG. 25 includes a LFSR 410, an output control circuit 411, and an AND gate 412 which are connected as shown. Reference clock pulses are applied to a terminal 407. M clock pulses are required to generate random pulses amounting to a maximum period of the random pulses. The clock pulses supplied to the LFSR 410 and the output control circuit 411, and the AND gate 412 recieves the outputs of the LFSR 410 and the output control circuit 411.

The output control circuit 411 is made up of AND gates 413 and 414, frequency dividing counters 415 and 416, and an inverter 417 which are connected as shown. The frequency dividing counter 415 has a frequency dividing ratio of 1/N and the frequency dividing counter 416 has a frequency dividing ratio of 1/M, where N <M.

If predetermined bits are initially set in the LFSR 410 and the clock pulses are input to the terminal 407, the random pulses generated by the LFSR 410 in response to the clock pulses are output via the AND gate 412.

As described above, the pulses generated by the LFSR 410 are pseudo random pulses and the same pulses are repeated after one period. Hence, in this embodiment, after the LFSR 410 generates random pulses amounting to one period thereof in response to M clock pulses, N clock pulses are thereafter input to the LFSR 410 to resume the generation of the random pulses and improve the random nature of the generated random pulses.

In the initial state, the clock pulses are only input to the 1/M frequency dividing counter 416 of the output control circuit 411 via the AND gates 413 and 414. Hence, the initial state of the output control circuit 411 is set so that the 1/M frequency dividing counter 416 outputs a value "0". This output value "0" of the 1/M frequency dividing counter 416 is inverted by the inverter 417, and the output value "1" of the inverter 417 is input to one input of the AND gate 412. As a result, the AND gate 412 passes the random pulses generated by the LFSR 410.

When the number of clock pulses received from the terminal 407 reaches M from the initial state of the output control circuit 411, the output value of the 1/M frequency dividing counter 416 becomes "1" and the inverter 417 outputs the value "0" which is input to one input of the AND gate 412. Thus, the AND gate 412 blocks the random pulses which are generated by the LFSR 410. In this state, the clock pulses are input to only the 1/N frequency dividing counter 415 of the output control circuit 411 via the AND gates 413 and 414. The 1/N frequency dividing counter 415 continuously outputs the value "0" until the number of clock pulses received reaches N. When the number of clock pulses input to the terminal 407 reaches N in the state where the random pulses generated from the LFSR 410 are blocked by the AND gate 412, the output value of the 1/N frequency dividing counter 415 becomes "1", and the output control circuit 411 returns to its initial state. After the output control circuit 411 returns to its initial state, the AND gate 412 resumes output of the random pulses generated from the LFSR 410.

Therefore, when the random pulses amounting to one period are output from the LFSR 410, the output of the random pulses is resumed after N clock pulses are input to the LFSR 410. As a result, the same pulses are prevented from being output after one period, and the random nature of the random pulses generated from the random number generator 31 is improved.

Figure 26:
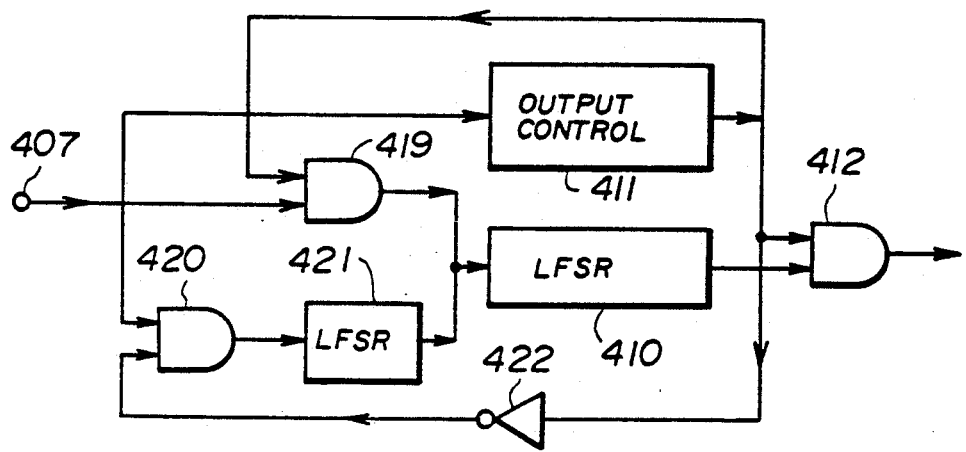
FIG. 26 is a circuit diagram showing another embodiment of the random pulse generator.

Next, a description will be given of another embodiment of the random pulse generator, by referring to FIG. 26. In FIG. 26, those parts which are the same as those corresponding parts in FIG. 25 are designated by the same numerals, and a description thereof will be omitted.

The random pulse generator 431 shown in FIG. 26 includes the LFSR 410, the output control circuit 411, AND gates 419 and 420, a LFSR 421, and an inverter 422 which are connected as shown. In other words, the output of the AND gate 419 is connected directly to the input of the LFSR 410, while the output of the AND gate 420 is coupled to the input of the LFSR 410 via the LFSR 421. Furthermore, the output of the output control circuit 411 is fed back directly to the AND gate 419 on one hand, and is fed back to the AND gate 420 via the inverter 422 on the other. The generation of the random pulses in response to the clock pulses is made by the n order LFSR 410 The m order LFSR 421 has a number of stages smaller than that of the n order LFSR 410 ($n>m$), and functions as a set value changing means for changing the number N of clock pulses input to the LFSR 410 every time after the output control circuit 411 operates.

Similarly as in the case of the random pulse generator 431 shown in FIG. 25, after the LFSR 410 outputs the random pulses amounting to one period in response to M clock pulses, the output of the random pulses is stopped and is resumed after N' clock pulses are input to the LFSR 410. In this state, when the output value of the output control circuit 411 becomes "0" in order to block the output random pulses of the LFSR 410, the clock pulses from the terminal 407 are input directly to the output control circuit 411 on one hand and is input to the LFSR 410 via the LFSR 421 on the other. Hence, the number of clock pulses input to the LFSR 410 is irregularly modulated until N clock pulses are input to the output control circuit 411 and the output of the random pulses is resumed, and the number N' of clock pulses input to the LFSR 410 is changed every time the output control circuit 411 operates. In other words, when the random pulses amounting to one period are output from the LFSR 410, the output of the random pulses is stopped and is resumed after a certain number of clock pulses are input to the LFSR 410, where this certain number changes for each period of the random pulses. Consequently, the random nature of the generated random pulses is extremely satisfactory in this embodiment.

Of course, the set value changing means is not limited to the LFSR 421 which changes the number N of clock pulses by modulation of the clock pulses, and the number N of clock pulses may be changed by other set value changing means.

Figure 27:
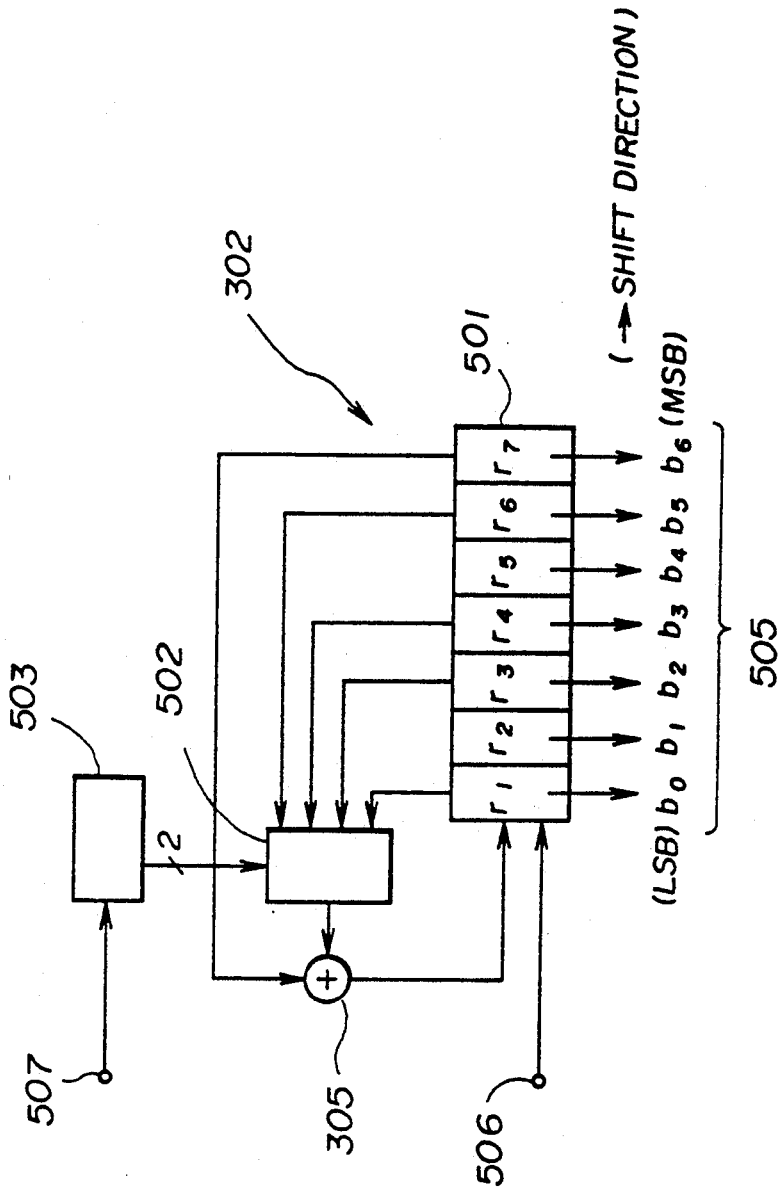
FIG. 27 is a circuit diagram showing a fourth embodiment of the random number generator.

Next, a description will be given of a fourth embodiment of the random number generator 31, by referring to FIG. 27. In FIG. 27, those parts which are the same as those corresponding parts in FIG. 24 are designated by the same reference numerals, and a description thereof will be omitted.

The random number generator 31 shown in FIG. 27 includes a 7-bit shift register 501, a selector 502, a 2-bit binary counter 503, and an exclusive-OR gate 305 which are connected as shown. The shift register 501, the exclusive-OR gate 305 and the selector 502 form the LFSR 302. Count clock pulses are input to a terminal 507, and shift clock pulses are input to a terminal 506. An output 505 of the shift register 501 is made up of bits $b_0$ through $b_6$, where $b_0$ is regarded as the LSB of the binary random value and the bit $b_6$ is regarded as the MSB of the binary random value.

Figure 28A:
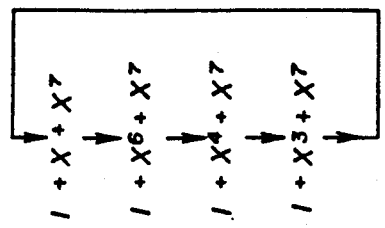
FIG. 28 is a diagram for explaining the relationship of the counter content, feedback position and the characteristic polynomial in the fourth embodiment of the random number generator.
Figure 28B:
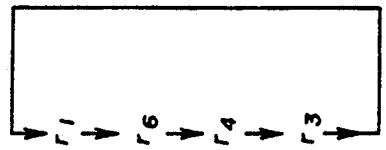
Figure 28C:
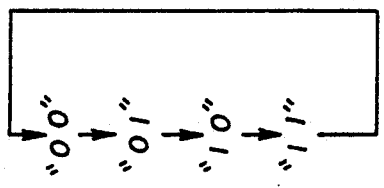

The binary counter 503 sequentially outputs values "00", "01", "10" and "11" when counting the count clock pulses from the terminal 507, and the output of the binary counter 503 is supplied to the selector 502. As shown in FIG. 28 (A) and (B), the selector 502 outputs a register data bit $r_1$ of the shift register 501 in response to the output "00" of the binary counter 503, a register data bit $r_2$ in response to the output "01", a register data bit $r_3$ in response to the output "10", and a register data bit $r_4$ in response to the output "11". The output of the selector 502 is fed back to the shift register 501 via the exclusive-OR gate 305.

For example, if the initial value of the binary counter 503 is "00" and an initial value "0000001" is set in the shift register 501, the selector 502 first selectively feeds back the register data bit $r_1$ and the random numbers 64, 1, 3, 7, 15, 31, . . . described by the characteristic polynomial $1+x+x^7$ shown in FIG. 28 (C) are sequentially output from the shift register 501 by inputting 127 shift clock pulses via the terminal 506. Next, at least one count clock is input to the terminal 507. For example, if one count clock is input to the terminal 507, the count of the binary counter 503 advances by one, that is, changes from the initial value "00" to the value "01", and the selector 502 thereafter switches the feedback from the register data bit $r_1$ to the register data bit $r_6$.

When 127 shift clock pulses are input from the terminal 506 in this state, the random numbers 64, 1, 2, 4, 8, 16, 32, . . . described by the characteristic polynomial $1+x^6+x^7$ shown in FIG. 28 (C) are sequentially output from the shift register 501. These random numbers are generated in a sequence different from that of before.

The count clock pulses input to the terminal 507 need only be controlled so that at least one count clock pulse is input for every predetermined period. Further, the binary counter 503 is not limited to the 2-bit counter and may be an n bit counter. In this case, m bits out of the n bits are decoded and the decoded output is used to control the selector 502.

As in the case of the previously described embodiments of the random number generators, the number of bits of the shift register 501 forming the LFSR 302 is not limited to 7. If the number of bits of the shift register 501 is other than 7, the feedback position (that is, the register data bits) used may be other than the 4 positions shown in FIG. 27. In other words, the number of bits of the shift register 501 and the number and positions of the feedback are not limited to those of the described embodiment.

According to this embodiment of the random number generator 31 shown in FIG. 27, the feedback position is cyclically updated as shown in FIG. 28 every time the random number sequence is repeatedly generated, so that a different kind of random number sequence is generated each time.

Figure 29:
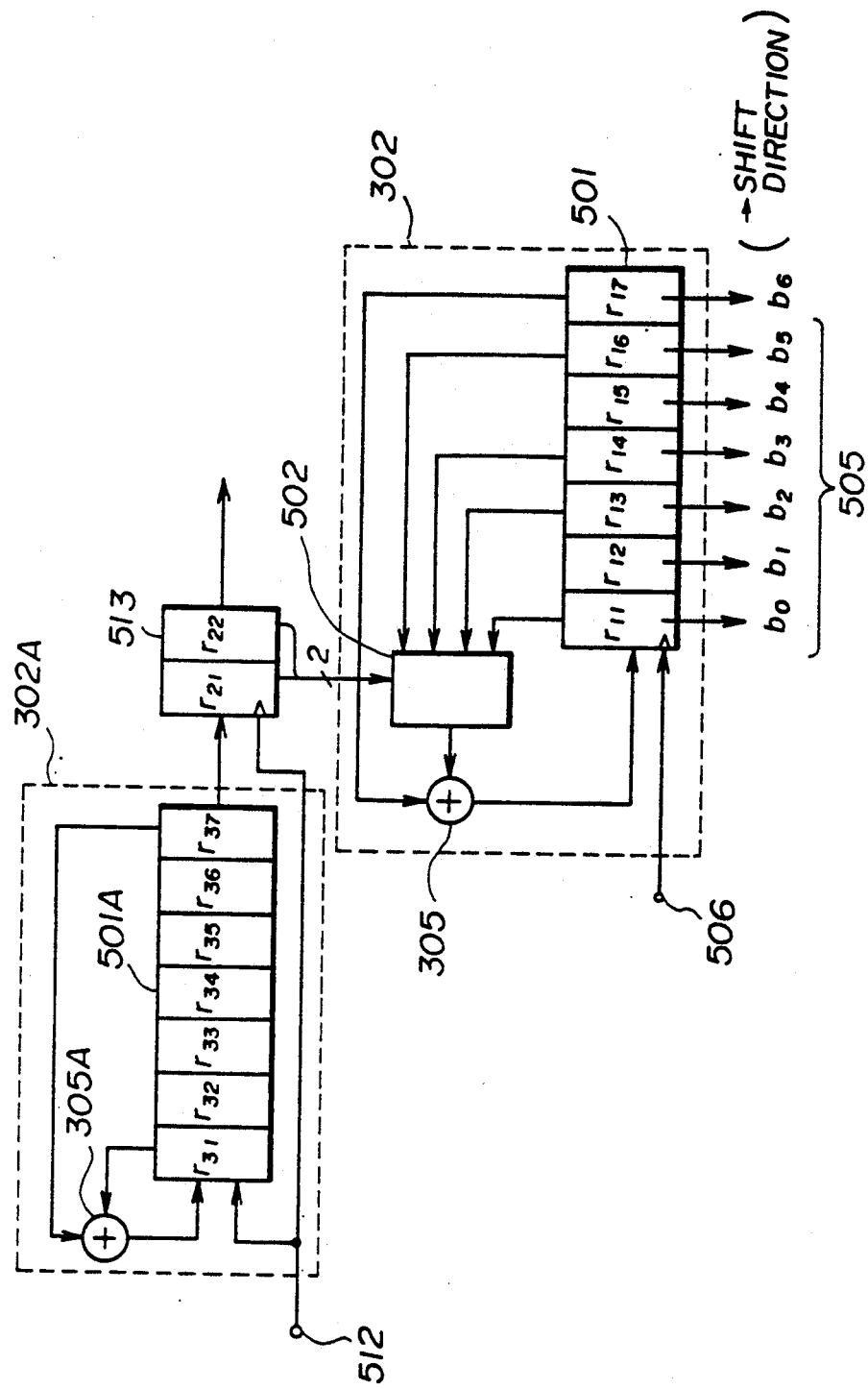
FIG. 29 is a circuit diagram showing a fifth embodiment of the random number generator.

Next, a description will be given of a fifth embodiment of the random number generator 31, by referring to FIG. 29. In FIG. 29, those parts which are the same as those corresponding parts in FIG. 27 are designated by the same reference numerals, and a description thereof will be omitted.

The random pulse generator 31 shown in FIG. 29 includes a first LFSR 302A, a 2-bit shift register 513, and a second LFSR 302 which is identical to the LFSR 302 shown in FIG. 27.

The selector 502 of the LFSR 502 receives the output of the 2-bit shift register 513 and switches the feedback position of the shift register 501 based thereon. The selector 502 selects the register data bit $r_{11}$ of the shift register 501 if the output of the shift register 513 is "00", selects the register data bit $r_{16}$ if the output of the shift register 513 is "01", selects the register data bit $r_{14}$ if the output of the shift register 513 is "10", and selects the register data bit $r_{13}$ if the output of the shift register 513 is "11".

The shift out terminal of the first LFSR 302A is connected to the shift input terminal of the shift register 513, so that the shift out data of the first LFSR 302A can be input to the shift register 513. The feedback position of the first LFSR 302A is fixed to the register position $r_{31}$, so as to generate the random number sequence described by the characteristic formula $1+x+x^7$.

For example, an initial value "11" is set in the shift register 513, an initial value "0000001" is set in the shift register 501 of the second LFSR 302, and an initial value "1011100" is set in the shift register 501A of the first LFSR 302A. In this case, the content of the shift register 503 is "11", and the register data bit $r_{13}$ of the shift register 501 is selectively fed back to the shift register 501 via the selector 502 and the exclusive-OR gate 305. By inputting 127 shift clock pulses to the terminal 506 in this state, the random number sequence made up of the random numbers 64, 1, 2, 4, 9, 18, 36, . . . described in binary are sequentially output as the output 505 of the second LFSR 302.

Figure 30:
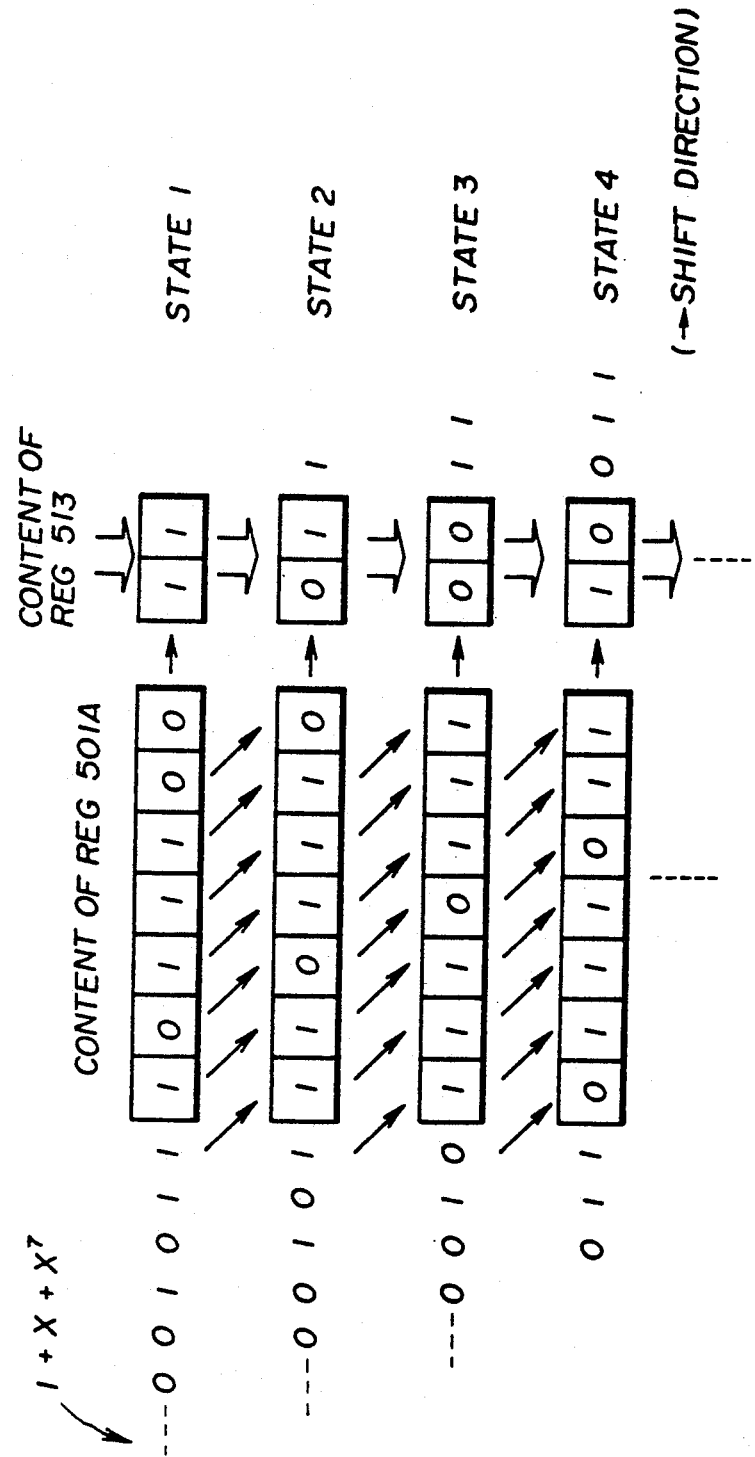
FIG. 30 is a diagram for explaining the operation of the fifth embodiment of the random number generator.

Next, at least one shift clock pulse is input to the terminal 512. For example, if only one shift clock pulse is input to the terminal 512, the content of the shift register 513 changes from "11" to "01", and the feedback position of the second LFSR 302 changes from $r_{13}$ to $r_{16}$. When 127 shift clock pulses are input again to the terminal 506 in this state, the random number sequence made up of the random numbers 64, 1, 2, 4, 8, 16, 32, . . . are obtained as the output 505 of the second LFSR 302. The sequence of the random numbers generated in this case is different from that of the random numbers generated previously. Thereafter, the content of the shift register 513 changes to "01", "00", "10", . . . as shown in FIG. 30 every time the random pulses amounting to one period are output from the second LFSR 302. Thus, it is possible to generate the random numbers having mutually different sequences for each period of the random pulses.

In addition, the binary number sequence generated by the first LFSR 302A is a M sequence signal. For this reason, the content of the shift register 501A changes at random at every repetition.

Of course, the number of bits of the registers 501 and 501A is not limited to 7, and the feedback position of the first LFSR 302A is not limited to that shown in FIG. 29.

Figure 31:
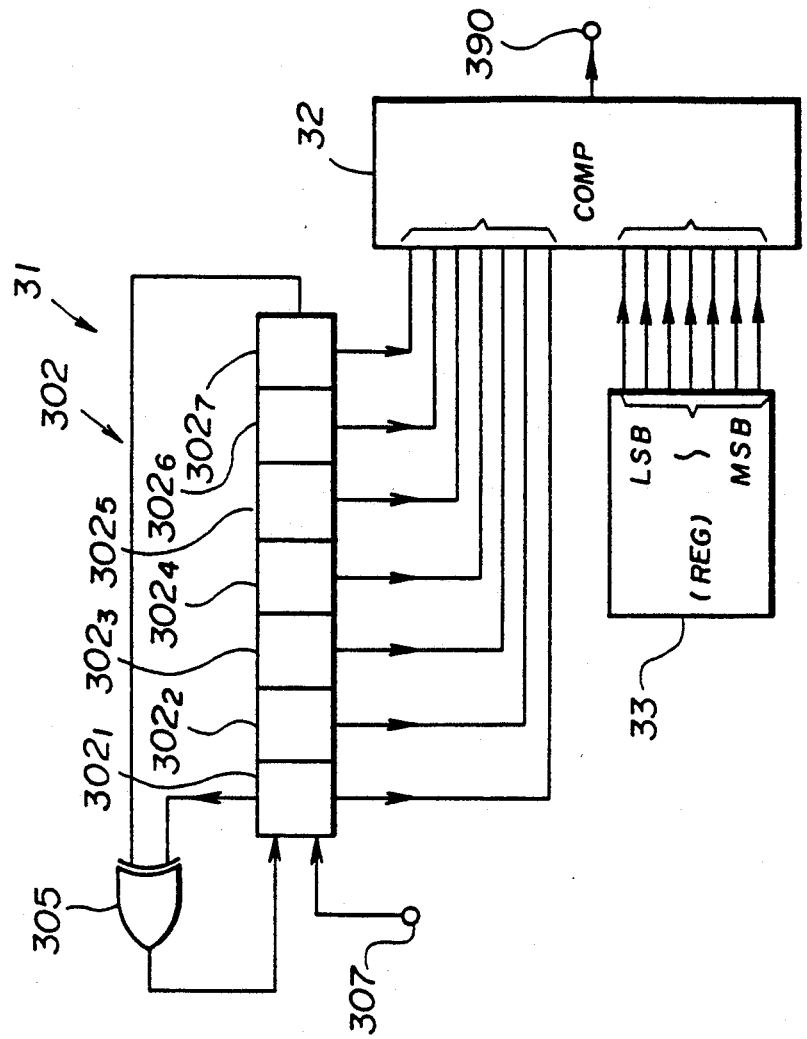
FIG. 31 is a system block diagram showing the first embodiment of the random number generator together with the essential part of the fourth embodiment of the neuron unit.

FIG. 31 shows the first embodiment of the random number generator 31 shown in FIG. 18A together with the essential part of the fourth embodiment of the neuron unit according to the present invention shown in FIG. 17.

In FIG. 31, the register 33 is set from a keyboard (not shown) or the like. A decimal number is set from the keyboard and this decimal number is converted into a binary signal and output to the comparator 32. The binary output of the register 33 is fixed to a value from 1 to 127 if the register 33 has 7 bits, for example. If the decimal value "10" is set in the register 33, for example, the comparator 32 compares the 7-bit output of the register 33 describing the decimal number "10" with the 7-bit output from the LFSR 302 in response to each clock pulse applied to the terminal 307. The comparator 32 outputs the value "1" via a terminal 390 if the 7-bit output of the LFSR 302 is less than or equal to the 7-bit output of the register 33, and otherwise outputs the value "0". Hence, the output value of the comparator 32 has the value "1" at a rate of 10/127.

But since the random pulses output from the LFSR 302 has a periodic nature dependent on the order of the LFSR 302 as described above, it is preferable to improve the random nature of the output value of the comparator 32.

Figure 32:
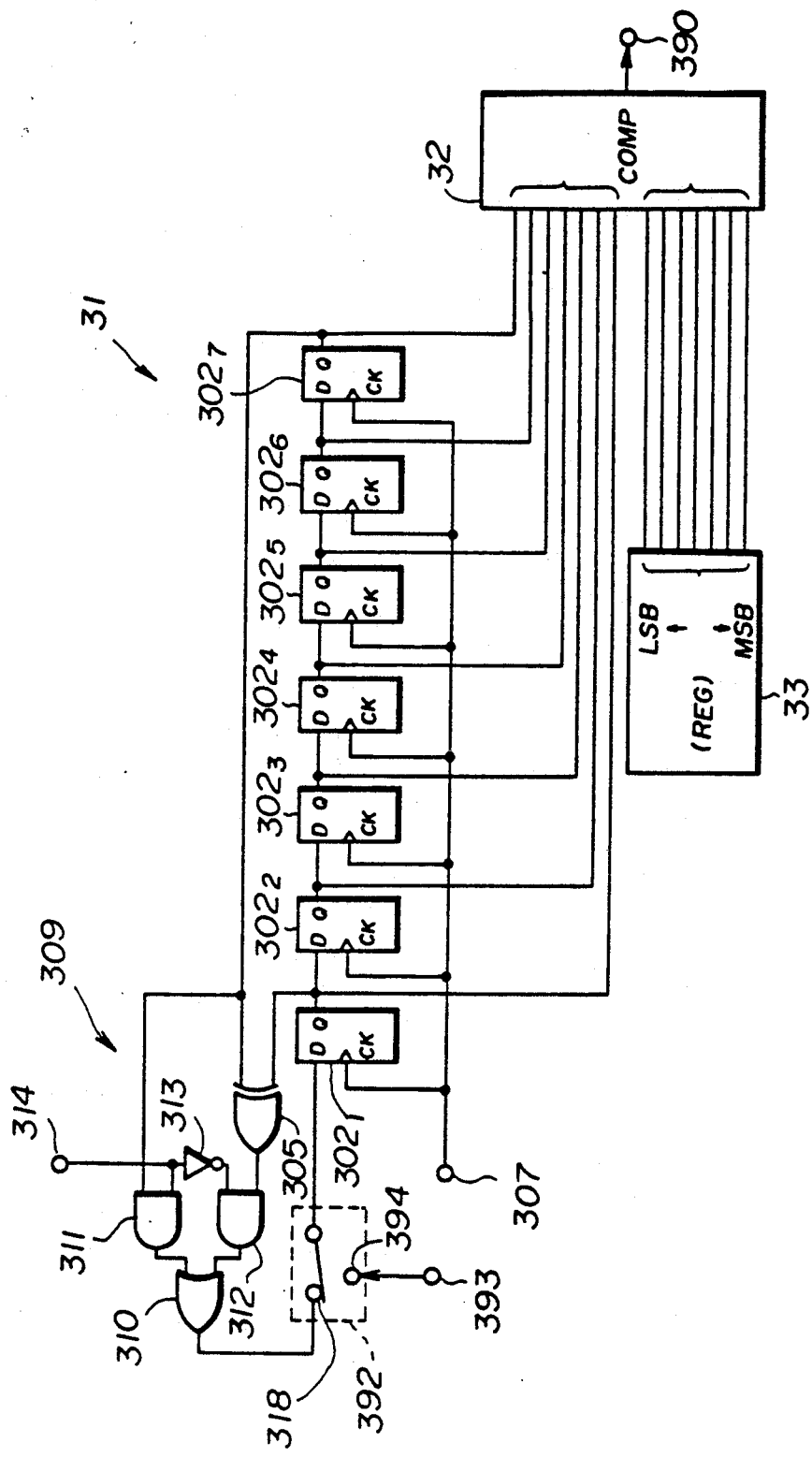
FIG. 32 is a system block diagram showing an sixth embodiment of the random number generator together with the essential part of the fourth embodiment of the neuron unit.

FIG. 32 shows a sixth embodiment of the random number generator 31 together with the essential part of the fourth embodiment of the neuron unit shown in FIG. 17. In FIG. 32, those parts which are the same as those corresponding parts in FIGS. 21, 22 and 31 are designated by the same reference numerals, and a description thereof will be omitted.

According to this embodiment, the random nature of the output value of the comparator 32 is improved compared to that shown in FIG. 31, because the 7-bit output of the LFSR 302 does not have a cyclic pattern due to the provision of the switching circuit 309.

In FIG. 32, the initial value of the LFSR 302 may be set from a terminal 393 by switching the connection of a switch 392 to a terminal 394 from the terminal 318.

Figure 33:
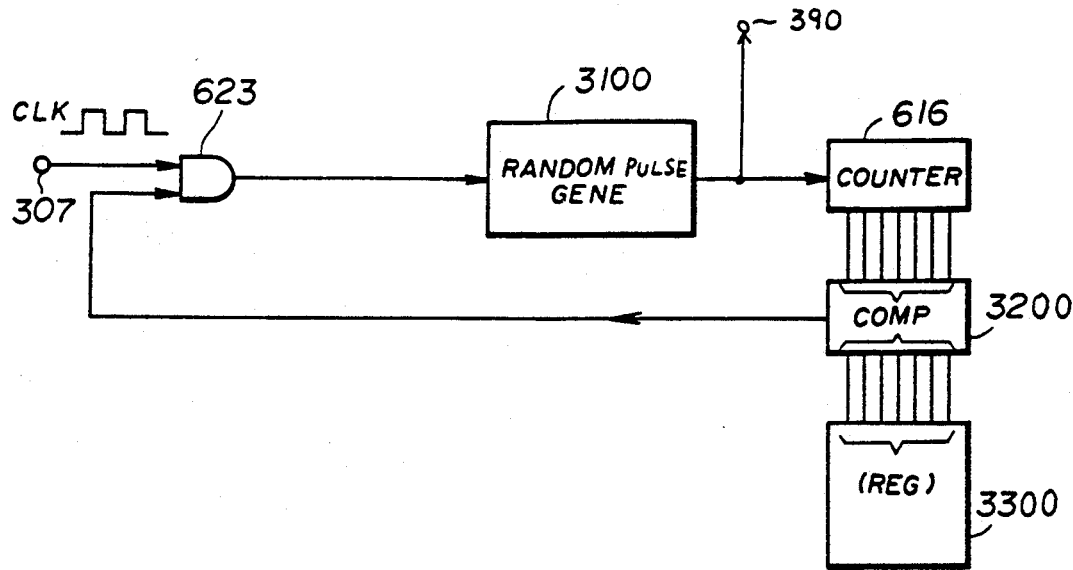
FIG. 33 is a system block diagram showing an essential part of a fifth embodiment of the neuron unit according to the present invention.

Next, a description will be given of a fifth embodiment of the neuron unit according to the present invention, by referring to FIG. 33. In FIG. 33, those parts which are the same as those corresponding parts in FIGS. 31 and 32 are designated by the same reference numerals, and a description thereof will be omitted.

Figure 34:
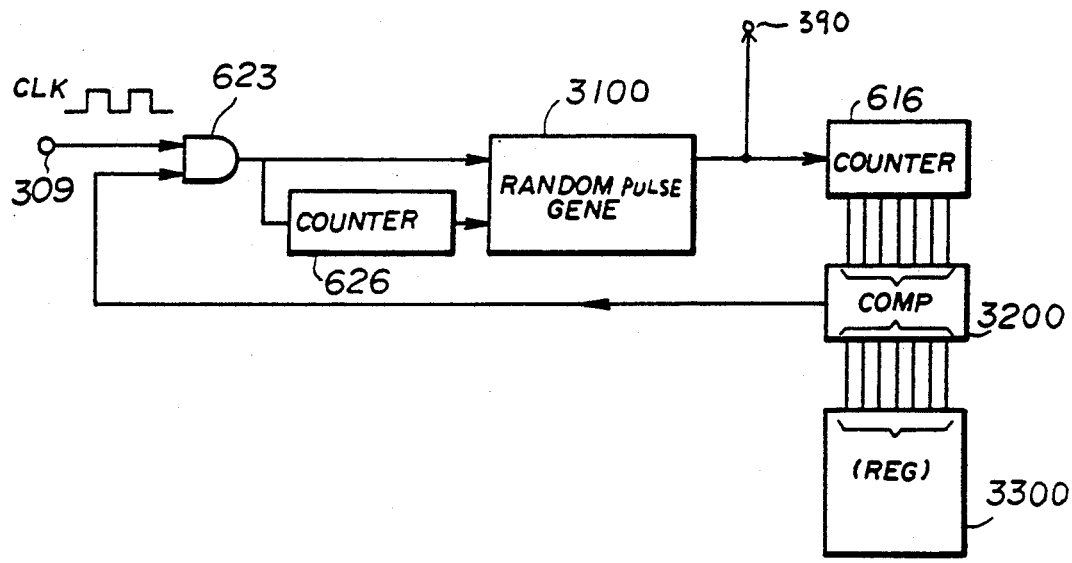
FIG. 34 is a system block diagram showing an essential part of a sixth embodiment of the neuron unit according to the present invention.

In this embodiment, a random pulse generating part 3100 is made up of the random number generator 31, the comparator 32 and the register 33 shown in FIG. 17, where the random number generator 31 has a construction identical to that shown in FIGS. 31, 33 and 34. If a decimal number set in the register 33 is "10", the random pulse sequence which is output from the terminal 390 is the same after 10 random pulses are generated. In other words, after 10 random pulses are generated, the output bits of the LFSR 302 of the random number generator 31 are all "0" until one period of the random pulses ends, and there is no need to generate any random pulses from the LFSR 302 after 10 random pulses are generated. Hence, this embodiment utilizes this feature of the LFSR 302 and obtains a predetermined number of random pulses by inputting no clock pulse to the LFSR 302 after the number of random pulses are generated, so as to eliminate the periodic nature of the LFSR 302.

In this embodiment, a random pulse counter 616 is connected to the output of the random pulse generating part 3100, and the 7-bit output of the counter 616 is supplied to a comparator 3200, as shown in FIG. 33. In addition, the clock pulses input to the terminal 307 are supplied to the random pulse generating part 3100 via an AND gate 623 which also receives the output of the comparator 3200.

The comparator 3200 outputs the value "1" if the 7-bit output of the counter 616 is smaller than the 7-bit output of the register 3300, and otherwise outputs the value "0". The 7-bit output of the register 3300 has a fixed value selected from "1" to "127", for example.

If the number of random pulses counted in the counter 616, that is, the value output from the counter 616, is denoted by R, and the fixed value output from the register 3300 is denoted by Q, the comparator 3200 outputs the value "1" if $R<Q$ and otherwise outputs the value "0". Because the output of the comparator 3200 is fed back to the AND gate 623, the supply of the clock pulses to the random pulse generating part 3100 is stopped when $R=Q$. As a result, the generation of the random pulses by the random pulse generating part 3100 is interrupted, and the periodic nature of the random pulses output from the random pulse generating part 3100 is eliminated.

The generation of the random pulses from the random pulse generating part 3100 for next period of the random pulses, without the need to reset the initial value of the LFSR 302. Accordingly, the random characteristic of the random pulses output via the terminal 390 is improved.

The fifth embodiment is particularly effective if the value Q is small. However, if the value Q is large, it becomes frequently necessary to input a number of clock pulses amounting to more than one period of the random pulses generated by the LFSR 302 in order to count the value Q. Hence, in this case, it is necessary to change the initial value of the LFSR 302 as done in the sixth embodiment which will be described hereunder.

FIG. 34 shows an essential part of a sixth embodiment of the neuron unit according to the present invention. In FIG. 34, those parts which are the same as those corresponding parts in FIG. 33 are designated by the same reference numerals, and a description thereof will be omitted.

In FIG. 34, a frequency dividing counter 626 is provided between the AND gate 623 and the random number generator 31. This frequency dividing counter 626 has the function of counting the clock pulses which are supplied from the terminal 307 to the random pulse generating part 3100 via the AND gate 623, and the function of supplying the output thereof to the random pulse generating part 3100 only when the number of clock pulses counted corresponds to one period of the generated random pulses. In other words, the frequency dividing counter 626 also functions to change the initial value set in the LFSR 302 of the random pulse generating part 3100.

Because the initial value set in the LFSR 302 of the random pulse generating part 3100 is changed by the output of the frequency dividing counter 626 after the frequency dividing counter 626 counts a number of clock pulses required to generate the random pulses amounting to one period, the random pulse sequence output from the random pulse generating part 3100 is different for each period of the random pulses. As a result, the periodic nature of the pulses output from the random pulse generating part 3100 is eliminated, and the random characteristic of the random pulse sequence output via the terminal 390 is improved. Of course, the frequency dividing counter 626 is reset automatically after the frequency dividing counter 626 counts the number of clock pulses required to generate the random pulses amounting to one period.

The method of changing the initial value set in the LFSR 302 of the random pulse generating part 3100 is of course not limited to that using the frequency dividing counter 626 shown in FIG. 34, and various other variations are possible.

In the neuron unit according to the present invention, it is necessary to use a plurality of weighting coefficients. Hence, a plurality of circuit systems having a circuit construction such as those shown in FIGS. 17 and 31 through 34 must be provided. In other words, it is necessary to provide a plurality of random number generators. When providing a plurality of random number generators, it is preferable to provide random number generators having the same construction in order to minimize the cost and simplify the production process.

However, if the random number generators are identical in construction and are set with the same initial value, the random number sequences generated therefrom naturally become the same. For this reason, it is desirable to take measures so that mutually different initial values are set in the random number generators.

Furthermore, if all of the bits of the initial value are "0", the random numbers which are generated will be fixed to "0", and it is therefore necessary to prevent such an initial value from being set in the random number generators.

Figure 35:
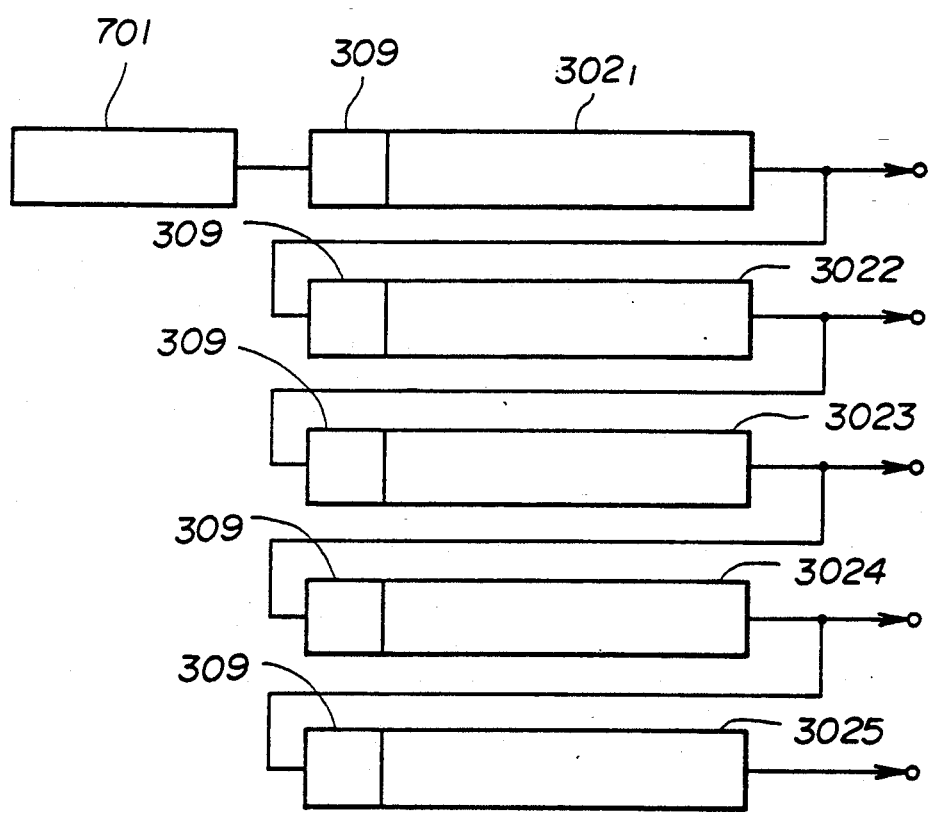
FIG. 35 is a system block diagram showing an essential part of a seventh embodiment of the neuron unit according to the present invention.

FIG. 35 shows an essential part of a seventh embodiment of the neuron unit according to the present invention. FIG. 35 only shows a plurality of random number generators which are linked so that mutually different initial values are set therein. In FIG. 35, those parts which are the same as those corresponding parts in FIG. 21 are designated by the same reference numerals, and a description thereof will be omitted.

In FIG. 35, a plurality of LFSRs 3021 through 3025 are linked via respective switching circuits 309. In addition, a bit generating part 701 is connected to the LFSR 3021 via a switching circuit 309.

Figure 36:
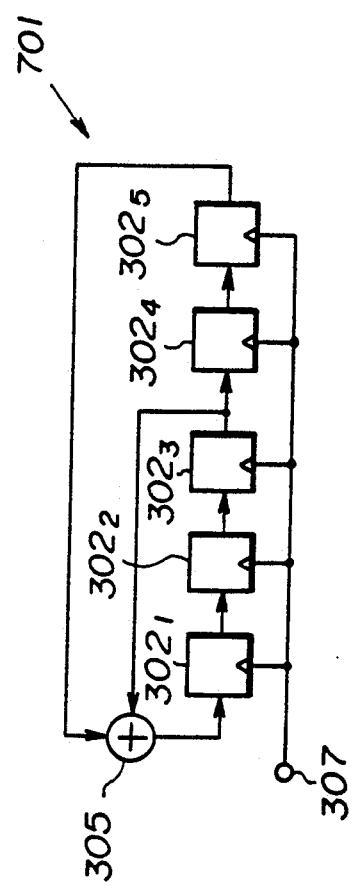
FIG. 36 is a circuit diagram showing a bit generating part shown in FIG. 35.
Figure 37:
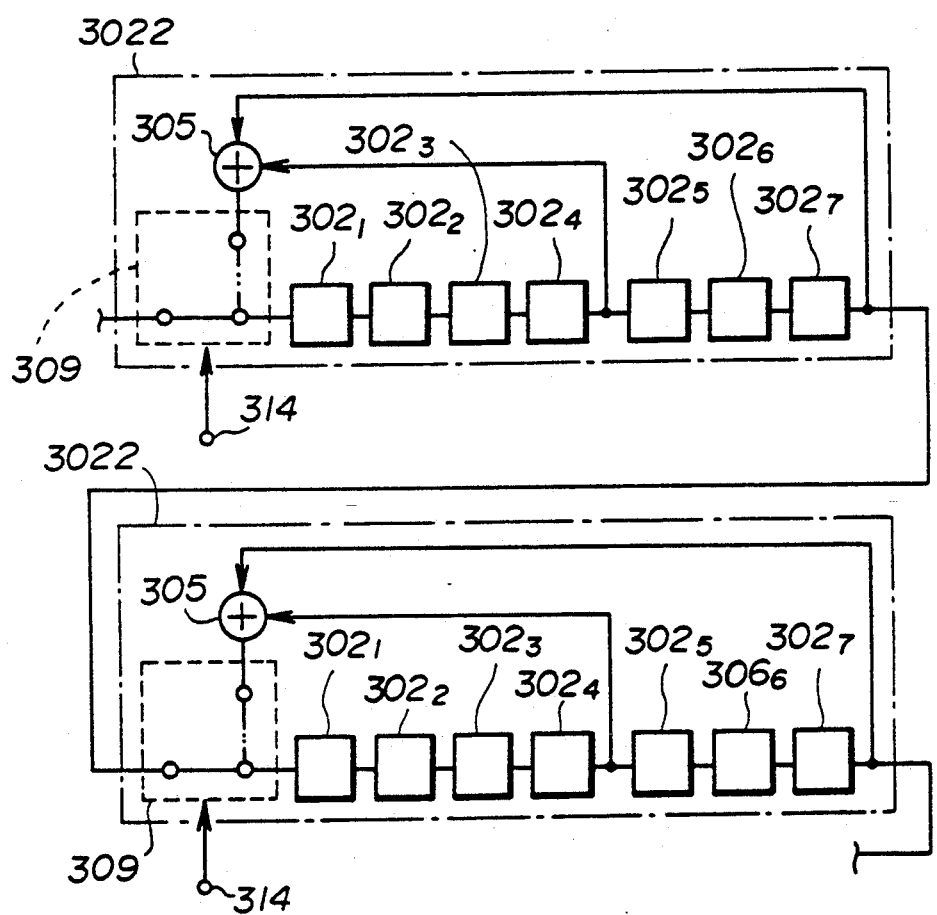
FIG. 37 is a circuit diagram showing an essential part of LFSRs shown in FIG. 35.

For example, the bit generating part 701 is made up of a LFSR having 5 bits as shown in FIG. 36. In addition, the LFSRs 3021 through 3027 respectively have constructions which are basically the same as that of the LFSR 302 shown in FIG. 21 except for the feedback position, and respectively have 7 bits, for example. FIG. 37 shows the constructions of only the LFSRs 3022 and 3023 for the sake of convenience. In FIG. 37, the illustration of the clock signal line is omitted for the sake of convenience. In FIGS. 36 and 37, those parts which are the same as those corresponding parts in FIG. 21 are designated by the same reference numerals, and a description thereof will be omitted. Normally, each switching circuit 309 is connected to input the output of the exclusive-OR gate 305 to the flip-flop $302_1$ of the first stage of the respective LFSR 302J, where J=1 to 5.

Figure 38:
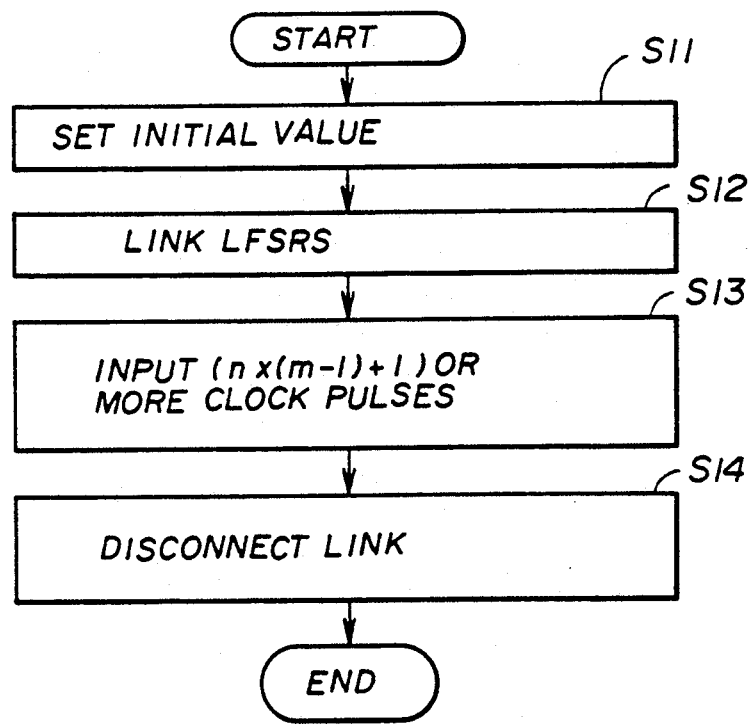
FIG. 38 is a flow chart for explaining the operation of the seventh embodiment of the neuron unit according to the present invention.

FIG. 38 is a flow chart for explaining the operation of the seventh embodiment of the neuron unit according to the present invention.

In FIG. 38, a step S11 sets a predetermined initial value into the bit generating part 701. A step S12 controls each switching circuit 309 to disconnect the connection of the output of the exclusive-OR gate 305 to the input of the corresponding LFSR 302J and to connect the output of the LFSR 302J to the input of the LFSR 302(J+1). In this embodiment, the output of the LFSR 3025 is not connected to a switching circuit, and the switching circuit 309 connects the output of the bit generating part 701 to the LFSR 3021. When the LFSRs 3021 through 3025 are linked by the switching circuits 309, a shift register having 35 (=5×7) stages is formed.

In this state, a step S13 inputs 29 (=7×(5−1)+1) or more clock pulses to the bit generating part 701 and each of the LFSRs 3021 through 3025. As a result, at least one bit having the value "1" is set in each of the LFSRs 3021 through 3025 by the bit sequence output from the bit generating part 701 in response to the clock pulses. After the input of such a bit sequence, a step S14 controls each switching circuit 309 to return the connection to the normal connection. In other words, 5 7-bit LFSRs are formed from 1 35-bit shift register by the switching of the switching circuits 309.

In this embodiment, a low-level control signal (that is, a value "0") supplied to each switching circuit 309 via the terminal 314 connects the output of the exclusive-OR gate 305 to the input of the corresponding LFSR 302J, and a high-level control signal (that is, a value "1") switches the connection to the output of the LFSR of the preceding stage. Such a control signal may be generated from a control circuit (not shown) by known means.

Because the LFSR forming the bit generating part 701 is 5 bits and the initial value thereof is set so that the number of continuous bits having the value "0" is less than 5, at least one bit having the value "1" is set in each of the LFSRs 3021 through 3025. Therefore, it is possible to prevent all of the bits of the initial value from becoming "0" in each of the LFSRs 3021 through 3025. Furthermore, because the setting of the initial value is made via the linearly connected LFSRs 3021 through 3025, mutually different initial values are automatically set in each of the LFSRs 3021 through 3025 approximately at the same time.

It is desirable that the bit sequence output from the bit generating part 701 is also at random. If the period of the bit sequence output from the bit generating part 701 is an integral multiple of the number of stages of each LFSR 302J, the period of the initial value of each LFSR 302J becomes short. For this reason, it is desirable that the period of the bit sequence output from the bit generating part 701 is not an integral multiple of the number of stages of each LFSR 302J.

For example, if the period of the bit sequence output from the bit generating part 701 is "35", the same bit is input for every 5 (=35/7) 7-bit LFSRs, and thus, the random characteristic of the generated random pulses will deteriorate if more than 5 7-bit LFSRs are linked. But if the period of the sequence output from the bit generating part 701 is "36", it is possible to simultaneously set mutually different initial values to a maximum of 36 7-bit LFSRs without deteriorating the random characteristic of the generated random pulses. Therefore, the concept of linking a plurality of LFSRs to simultaneously set mutually different initial values is particularly effective when used in the neuron unit according to the present invention.

Further, the present invention is not limited to these embodiments, but various variations and modifications may be made without departing from the scope of the present invention.

What is claimed is:

1. A neuron unit for processing a plurality of binary input signals and for outputting a neuron output signal which is indicative of a result of the processing, said neuron unit comprising:

a plurality of first gate means, respectively for carrying out a logical operation on a binary input signal and a weighting coefficient;

a second gate means, coupled to said first gate means, for carrying out a logical operation on an excitatory output signal of each of said first gate means;

a third gate means, coupled to said first gate means, for carrying out a logic operation on an inhibitory output signal of each of said first gate means;

a fourth gate means, coupled to said second and third gate means, for synthesizing output signals of said second and third gate means and outputting the neuron output signal; and generating means, coupled to said first gate means, for generating the weighting coefficients which are supplied to each of said first gate means, said generating means for generating one weighting coefficient including a random number generator for generating random numbers, and a comparator for comparing each random number r output from the random number generator with a predetermined value r and for outputting a pulse signal having first and second values depending on whether each random number r is such that $r \leq q$ or $r > q$, each weighting coefficient being described by a pulse density which is defined by at least one of a number of the first values and a number of the second values of the pulse signal within a predetermined time, where the first and second values are arranged at random and the first and second values respectively correspond to high and low binary signal levels.

2. The neuron unit as claimed in claim 1, wherein said generating means further includes a register for storing the predetermined value q.

3. The neuron unit as claimed in claim 1, wherein the random number generator of said generating means includes a linear feedback shift register which successively shifts bits of an initial value set therein in response to clock pulses.

4. The neuron unit as claimed in claim 1, wherein the random number generator of said generating means includes an n-bit shift register having an input part for successively shifting bits of an initial value set therein in response to clock pulses, an exclusive-OR circuit for obtaining an exclusive-OR of two arbitrary ones of n outputs of the shift register, and a switching circuit for selectively outputting one of an output of the exclusive-OR circuit and an arbitrary one of the n outputs of the shift register in response to a control signal, said switching circuit supplying an output thereof to the input part of the shift register.

5. The neuron unit as claimed in claim 1, wherein the random number generator of said generating means includes an n-bit shift register having an input part for successively shifting bits of an initial value set therein in response to clock pulses, a switching circuit for selectively outputting one of two arbitrary ones of n outputs of the shift register in response to a control signal, and an exclusive-OR circuit for obtaining an exclusive-OR of an arbitrary one of the n outputs of the shift register and an output of the switching circuit, said exclusive-OR circuit supplying an output thereof to the input part of the shift register.

6. The neuron unit as claimed in claim 1, wherein the random number generator of said generating means includes a linear feedback shift register having an input part, and output control means, coupled to the linear feedback shift register, for operating to block an output of the linear feedback shift register if a number of clock pulses counted by the linear feedback shift register reaches M until N more clock pulses are input to the linear feedback shift register, where M denotes a number of clock pulses required to generate pulses from the linear feedback shift register amounting to one period of a maximum length linearly recurring sequence signal, and N denotes a predetermined number such that $N < M$.

7. The neuron unit as claimed in claim 6, wherein the random number generator of said generating means further includes a means for changing the value N every time the output control means operates.

8. The neuron unit as claimed in claim 1, wherein the random number generator of said generating means includes an n-bit shift register having an input part for successively shifting bits of an initial value set therein in response to clock pulses, an exclusive-OR circuit for obtaining an exclusive-OR of a fixed one of n outputs of the shift register and an arbitrary one of n outputs of the shift register, and selector means for selecting the arbitrary one of the n outputs of the shift register to a different one of the n outputs every time a random pulse sequence is output from the shift register for a predetermined time, said exclusive-OR circuit supplying an output thereof to the input part of the shift register.

9. The neuron unit as claimed in claim 8, wherein the selector means of said generating means includes a counter for counting pulses of a predetermined signal, and a selector, coupled to the counter and specific ones of the n outputs of the shift register, for selectively supplying one of the specific ones of the n outputs depending on a counted value of the counter.

10. The neuron unit as claimed in claim 8, wherein the selector means of said generating means includes an m-bit shift register for shifting pulses of a predetermined signal, and a selector, coupled to the m-bit shift register and specific ones of the n outputs of the n-bit shift register, for selectively supplying one of the specific ones of the n outputs depending on a value stored in the m-bit shift register.

11. The neuron unit as claimed in claim 8, wherein the selector means of said generating means includes a linear feedback shift register for shifting pulses of a predetermined signal, and a selector, coupled to the linear feedback shift register and specific ones of the n outputs of the n-bit shift register, for selectively supplying one of the specific ones of the n outputs depending on an output value of the linear feedback shift register.

12. The neuron unit as claimed in claim 1, wherein the random number generator of said generating means includes first means for generating random pulses corresponding to the random numbers in response to clock pulses, and said generating means further includes:
second means for counting the random pulses output from said first means,
third means for comparing a counted value of the second means with a preset value, and
blocking means for blocking the clock pulses from being supplied to the first means depending on a comparison result of the third means.

13. The neuron unit as claimed in claim 12, wherein the said first means includes a linear feedback shift register which successively shifts bits of an initial value set therein in response to the clock pulses, and said generating means further includes fourth means for changing the initial value set in the linear feedback shift register when a number of the clock pulses supplied to the random number generator reaches a number required for said first means to generate the random pulses amounting to one period thereof.

14. The neuron unit as claimed in claim 1, wherein the random number generator of said generating means includes:
a plurality of linear feedback shift registers responsive to clock pulses,
switching means, coupled to the linear feedback shift registers, for connecting the linear feedback shift registers to form a single shift register in a first mode and for disconnecting the linear feedback shift registers into independent registers in a second mode, and
bit generating means, coupled to the single shift register, for generating at least one bit,
an initial value being set in each of the linear feedback shift registers when the switching means switches to the second mode after the bit from the bit generating means is transferred to the single shift register during the first mode of the switching means.

15. The neuron unit as claimed in claim 14, wherein the bit generating means includes a linear feedback shift register having a predetermined number of stages, and each linear feedback shift register of the random number generator has a number of stages greater than the predetermined number.

* * * * *